United States Patent
Chung et al.

(10) Patent No.: US 10,454,363 B1
(45) Date of Patent: Oct. 22, 2019

(54) SYNCHRONOUS RECTIFIER ALTERNATOR AND POWER ALLOCATION METHOD THEREOF

(71) Applicant: ACTRON TECHNOLOGY CORPORATION, Taoyuan (TW)

(72) Inventors: Shang-Shu Chung, Taoyuan (TW); Shih-Chieh Hou, Taoyuan (TW); Chien-Tin Chen, Taoyuan (TW); Wei-Jing Chen, Taoyuan (TW); Chi-Kai Wu, Taipei (TW)

(73) Assignee: ACTRON TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 16/194,401

(22) Filed: Nov. 19, 2018

(30) Foreign Application Priority Data

May 17, 2018 (TW) .............................. 107116696 A

(51) Int. Cl.
| | |
|---|---|
| *H02M 7/219* | (2006.01) |
| *H02M 1/42* | (2007.01) |
| *G05F 1/618* | (2006.01) |
| *H02M 3/335* | (2006.01) |
| *H02M 3/158* | (2006.01) |

(52) U.S. Cl.
CPC .......... *H02M 1/4225* (2013.01); *G05F 1/618* (2013.01); *H02M 3/1588* (2013.01); *H02M 3/33592* (2013.01); *H02M 7/219* (2013.01)

(58) Field of Classification Search
CPC ......... H02M 7/219; H02M 2007/2195; H02M 1/4225; H02M 3/1588; H02M 3/33592; H02J 7/242

USPC ......... 363/21.06, 53, 56.02, 81, 84, 89, 127, 363/131; 322/20, 25, 28, 36
See application file for complete search history.

(56) References Cited

U.S. PATENT DOCUMENTS

| | | | | |
|---|---|---|---|---|
| 5,739,677 | A * | 4/1998 | Tsutsui | H02J 7/242 322/20 |
| 6,081,084 | A * | 6/2000 | Crecelius | H02J 7/1492 318/145 |
| 7,919,949 | B2 * | 4/2011 | Namuduri | H02M 7/219 322/24 |
| 8,841,795 | B2 * | 9/2014 | Kaneda | H02P 9/10 307/9.1 |
| 9,354,622 | B2 * | 5/2016 | Masson | H02P 9/10 |
| 9,628,007 | B2 * | 4/2017 | Kimura | H02P 29/0241 |

(Continued)

*Primary Examiner* — Rajnikant B Patel
(74) *Attorney, Agent, or Firm* — JCIPRNET

(57) ABSTRACT

A synchronous rectifier alternator and a power allocation method thereof are provided. The synchronous rectifier alternator includes an alternator, a synchronous rectifier circuit and a controller. The alternator converts mechanical energy to alternating current (AC) electrical energy. The synchronous rectifier circuit converts the AC electrical energy to direct current (DC) electrical energy and provides the DC electrical energy to a load. The controller detects a voltage level of the DC electrical energy. When the controller detects that the voltage level is higher than or equal to a first threshold voltage value, the controller controls ONs and OFFs of first transistors and second transistors of the synchronous rectifier circuit, such that at least one of regulator diodes of the synchronous rectifier circuit, a stator of the alternator and the load consume power of the alternator.

16 Claims, 15 Drawing Sheets

(56) References Cited

U.S. PATENT DOCUMENTS 9,966,873 B2 * 5/2018 Zhang .................... H02M 7/217
2012/0081083 A1 * 4/2012 Horihata ........... H02M 7/53803
322/99

* cited by examiner

SYNCHRONOUS RECTIFIER ALTERNATOR AND POWER ALLOCATION METHOD THEREOF

CROSS-REFERENCE TO RELATED APPLICATION

This application claims the priority benefit of Taiwan application serial no. 107116696, filed on May 17, 2018. The entirety of the above-mentioned patent application is hereby incorporated by reference herein and made a part of this specification.

BACKGROUND OF THE INVENTION

1. Field of the Invention

The invention relates to a power generator, and particularly relates to a synchronous rectifier alternator and a power allocation method of the synchronous rectifier alternator when a load dump phenomenon occurs.

2. Description of Related Art

The conventional vehicle alternator is constituted of a rotor coil and a stator coil. When an excitation current passes through the rotor coil, the rotor coil may provide a magnetic field to the stator coil. When the internal combustion engine of the vehicle drives the rotor coil to rotate, the rotor coil generates a rotary magnetic field, and the stator coil generates alternating current (AC) electrical energy. A rectifier receives the AC electrical energy from the alternator and generates direct current (DC) electrical energy after rectification. The DC electrical energy may serve to charge a battery or to supply power to other loads, and the battery may serve to provide the excitation current to the rotor coil.

However, when a drastic change occurs at the load of the alternator or the load is suddenly unloaded, the power in the stator coil cannot be drained away immediately, which leads to the load dump phenomenon. When the load dump phenomenon occurs, the DC voltage provided by the rectifier alternator may oscillate in a greater amplitude, and an excessive variation in voltage amplitude may damage the components of the alternator or other loads. Therefore, how to quickly and safely drain away or consume the power in the stator coil and limit the DC voltage output by the rectifier alternator when the load dump phenomenon occurs is now an issue that the artisans of the field are facing.

SUMMARY OF THE INVENTION

Accordingly, one or some exemplary embodiments of the invention provide a synchronous rectifier alternator and a power allocation method of the synchronous rectifier alternator capable of quickly and safely draining away or consuming the power in an alternator (including a rotor and a stator coil) of the synchronous rectifier alternator and limit a direct current (DC) voltage output by a rectifier circuit of the synchronous rectifier alternator when the load dump phenomenon occurs, so as to protect the components of the synchronous rectifier alternator or the load of the synchronous rectifier alternator.

A synchronous rectifier alternator according to an embodiment of the invention serves to provide direct current (DC) electrical energy to a load. The synchronous rectifier alternator includes an alternator, a synchronous rectifier circuit and a controller. The alternator has a rotor and a stator, and converts mechanical energy into alternating current (AC) electrical energy. In addition, the stator has a plurality of stator coils. The synchronous rectifier circuit is electrically connected to the stator to convert the AC electrical energy into the DC electrical energy. The synchronous rectifier circuit includes a plurality of first transistors, a plurality of second transistors and at least one regulator diode. The regulator diode may be a Zener diode. Each of the first transistors is coupled between one of the stator coils and a first end of the load. Each of the second transistors is coupled between one of the stator coils and a second end of the load. Each of the at least one regulator diode is coupled to two ends of one of the first transistors and the second transistors to limit a voltage level of the DC electrical energy. The controller is coupled to the synchronous rectifier circuit to detect the voltage level of the DC electrical energy. The controller controls ONs and OFFs of the first transistors and the second transistors when detecting that the voltage level of the DC electrical energy is higher than or equal to a first threshold voltage value, so that at least one of at least part of the regulator diode, the stator, and the load consumes power of the alternator.

A power allocation method of a synchronous rectifier alternator according to an embodiment of the invention includes the following. A voltage level of direct current (DC) electrical energy rectified by the synchronous rectifier circuit is detected by the controller. Whether the voltage level of the DC electrical energy is higher than or equal to a first threshold voltage value is determined by the controller, so as to obtain a result of determination. ONs and OFFs of a plurality of first transistors and a plurality of second transistors of the synchronous rectifier circuit are controlled by the controller if the result of determination is YES, so that at least one of at least one regulator diode of the synchronous rectifier circuit, a stator, and a load of the synchronous rectifier alternator consumes power of the alternator.

Based on the above, in the synchronous rectifier alternator and the power allocation method of the synchronous rectifier alternator according to the embodiments of the invention, the power of the alternator is jointly drained away or consumed by at least one of the regulator diode, the stator, and the load, and the DC voltage output by the rectifier circuit is limited, so as to protect the components of the synchronous rectifier alternator or the load when the load dump phenomenon occurs.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
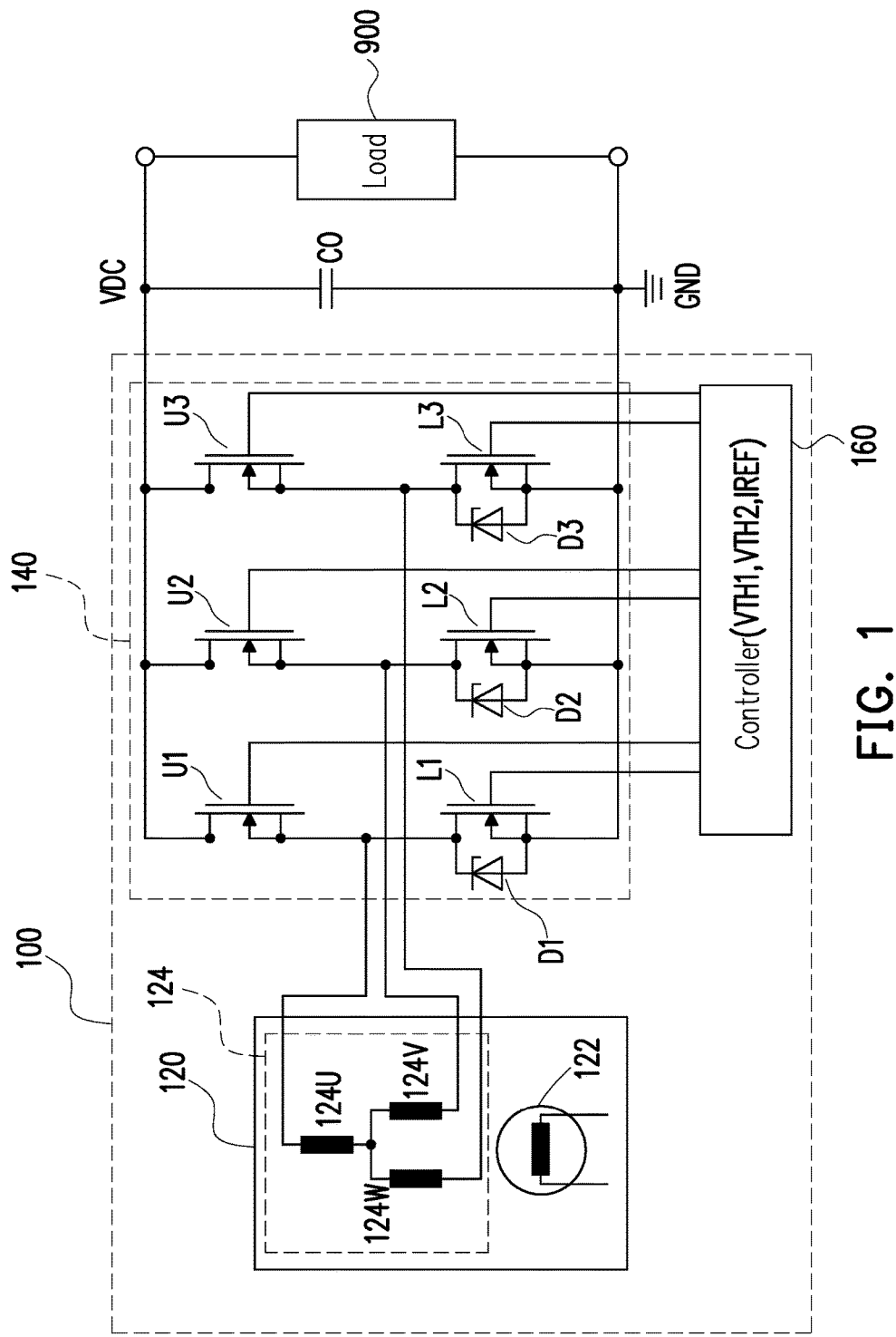
FIG. 1 is a schematic circuit block diagram illustrating a synchronous rectifier alternator according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, FIG. 1 is a schematic circuit block diagram illustrating a synchronous rectifier alternator according to an embodiment of the invention. A synchronous rectifier alternator 100 serves to provide direct current (DC) electrical energy to a load 900. The load 900 may be an electronic device, for example, but the invention is not limited thereto. The synchronous rectifier alternator 100 may include an alternator 120, a synchronous rectifier circuit 140, and a controller 160. However, the invention is not limited thereto. In an embodiment of the invention, the output end of the synchronous rectifier alternator 100 may be further coupled to an output (parasitic) capacitor or a battery CO to stabilize the output voltage. The alternator 120 has a rotor 122 and a stator 124. The rotor 122 and the stator 124 may work together to convert mechanical energy into alternating current (AC) electrical energy. The alternator 120 may be a multi-phase alternator, but the invention does not intend to limit the number of phases of the alternator 120. However, for the ease of description, the following embodiments are described with an example where the alternator 120 is a three-phase alternator, and the embodiments in which the number of phases of the alternator 120 is two or greater than three can be understood through inference based on the following description. Based on the above, the stator 124 of the alternator 120 has three stator coils 124U, 124V, and 124W. The first end of the stator coil 124U, the first end of the stator coil 124V, and the first end of the stator coil 124W are coupled to each other to form a coil structure in the inverted Y shape as shown in FIG. 1. However, the invention is not limited thereto. In other embodiments of the invention, the stator coils of the stator of the alternator 120 may also form a triangular coil structure.

The synchronous rectifier circuit 140 is electrically connected to the stator 124 to convert AC electrical energy into DC electrical energy. Since the alternator 120 is a three-phase alternator, the synchronous rectifier circuit 140 may include three first transistors L1 to L3 and three second transistors U1 to U3. In addition, a parasitic diode (not shown) may be provided at two ends of each of the first transistors L1 to L3 and the second transistors U1 to U3. The first transistor L1 is coupled between the second end of the stator coil 124U and the first end of the load 900. The first transistor L2 is coupled between the second end of the stator coil 124V and the first end of the load 900. The first transistor L3 is coupled between the second end of the stator coil 124W and the first end of the load 900. The second transistor U1 is coupled between the second end of the stator coil 124U and the second end of the load 900. The second transistor U2 is coupled between the second end of the stator coil 124V and the second end of the load 900. The second transistor U3 is coupled between the second end of the stator coil 124W and the second end of the load 900. The embodiment of FIG. 1 of the invention is described with an example where the first end of the load 900 serves as a ground end GND and the second end of the load 900 receives the DC electrical energy (whose voltage level is VDC) provided by the synchronous rectifier alternator 100. Therefore, the first transistors L1 to L3 may be considered as lower-arm switches, and the second transistors U1 to U3 may be considered as upper-arm switches. However, the invention is not limited thereto. Under normal operation, the AC electrical energy of the alternator 120 may be rectified into DC electrical energy by controlling the ONs and OFFs of the first transistors L1 to L3 and the second transistors U1 to U3. In an embodiment of the invention, the first transistors L1 to L3 and the second transistors U1 to U3 may be implemented as metal oxide semiconductor field effect transistors (MOSFETs). However, the invention is not limited thereto.

In addition, the synchronous rectifier circuit 140 may further include at least one regulator diode. However, for the ease of description, the synchronous rectifier circuit 140 is described with an example of having three regulator diodes D1 to D3. The embodiments where the synchronous rectifier circuit 140 has other numbers of regulator diodes can be understood through inference based on the following description. Besides, the embodiment of FIG. 1 of the invention is described with an example where the regulator diodes D1 to D3 are respectively coupled to the two ends of the first transistors L1 to L3. However, the invention is not limited thereto. In other embodiments of the invention, the regulator diodes D1 to D3 may also be respectively coupled to the two ends of the second transistors U1 to U3.

The regulator diodes D1 to D3 may serve to limit the voltage level VDC of the DC electrical energy provided by the synchronous rectifier alternator 100. For example, when the load dump phenomenon occurs, the voltage at the second end of the stator coil 124U (i.e., the cathode end of the regulator diode DO is increased, making the voltage level VDC of the DC electrical energy provided by the synchronous rectifier circuit 140 increased. When the voltage at the cathode end of the regulator diode D1 exceeds or reaches the breakdown voltage of the regulator diode D1, the regulator diode D1 may be broken down and limit the voltage level VDC of the DC electrical energy at a specific voltage value to prevent the voltage level VDC of the DC electrical energy from being excessively high and damaging the components of the synchronous rectifier alternator 100 or the load 900. In an embodiment of the invention, the regulator diodes D1 to D3 may be Zener diodes, for example. However, the invention is not limited thereto.

The controller 160 is coupled to the synchronous rectifier circuit 140 to detect the voltage level VDC of the DC electrical energy. When the controller 160 detects that the voltage level VDC of the DC electrical energy is higher than or equal to a first threshold voltage value VTH1, the controller 160 may determine that the synchronous rectifier alternator 100 encounters a load dump event and the load dump phenomenon occurs. Therefore, the controller 160 may control the ONs and OFFs of the first transistors L1 to L3 and the second transistors U1 to U3, so that at least one of at least part of the regulator diodes D1 to D3, the stator 124, and the load 900 consumes the power of the alternator 120 (including the power of the rotor 122 and the power of the stator 124).

In an embodiment of the invention, when the controller 160 detects that the voltage level VDC of the DC electrical energy is higher than or equal to the first threshold voltage value VTH1, and the controller 160 predicts or detects that the regulator diodes D1 to D3 do not overheat, at least part of the regulator diodes D1 to D3 may be operated in the breakdown condition by controlling the ONs and OFFs of the first transistors L1 to L3 and the second transistors U1 to U3, such that the at least part of the regulator diodes D1 to D3 consume the power of the alternator 120. In this way, not only the voltage level VDC of the DC electrical energy is limited by the broken-down diode, the power of the alternator 120 is also jointly drained away or consumed at least by the diode which is operated in the breakdown condition, the stator 124, and the load 900, so as to protect the components of the synchronous rectifier alternator 100 or the load 900. Since the power of the alternator 120 is at least jointly drained away or consumed by part of the regulator diodes, the stator 124, and the load 900 when the load dump phenomenon occurs, the issue that the temperatures of the regulator diodes D1 to D3 are too high (i.e., overheat) when most of the power of the alternator 120 is consumed only by the regulator diodes D1 to D3 is avoided, and the issue that the temperature of the stator 124 is too high and the time for power consumption is too long (due to the low resistance value of the stator 124) when the power of the alternator 120 is consumed only by the stator 124 is avoided, too.

In the embodiment of the invention, with at least one of at least part of the regulator diodes D1 to D3, the stator 124, and the load 900 consuming the power of the alternator 120, the voltage level VDC of the DC electrical energy is lowered. When the controller 160 detects that the voltage level VDC of the DC electrical energy is lower than a second threshold voltage value VTH2, by controlling the ONs and OFFs of the first transistors L1 to L3 and the second transistors U1 to U3, the regulator diodes D1 to D3 are refrained from consuming the power of the alternator 120. The first threshold voltage value VTH1 is higher than or equal to the second threshold voltage value VTH2.

In an embodiment of the invention, the controller 160 is further coupled to the stator 124 to detect the current value and the current direction of the stator 124, so as to determine the biased state of each of the first transistors L1 to L3 and each of the second transistors U1 to U3.

In an embodiment of the invention, the controller 160 may be implemented as hardware, firmware, or software or machine executable programming codes stored in a memory and loaded and executed by a microprocessor or a microcontroller. If the controller 160 is implemented as hardware, the controller 160 may be implemented with a single integrated circuit chip or multiple circuit chips. However, the invention is not limited thereto. The multiple circuit chips or the single integrated circuit chip can be realized with an application specific integrated circuit (ASIC) or a field programmable gate array (FPGA). The memory may be a random access memory, a read only memory, or a flash memory, etc., for example.

In the following, the operation after the synchronous rectifier alternator 100 encounters a load dump event is described in detail. However, for the ease of description, the following description is based on an example where the current in the stator 124 of the synchronous rectifier alternator 100 is flowing from the stator coil 124V to the stator coil 124U, and the second transistors U1 to U3 are all off when the synchronous rectifier alternator 100 encounters the dump event. Nevertheless, the invention is not limited thereto.

Figure 2A:
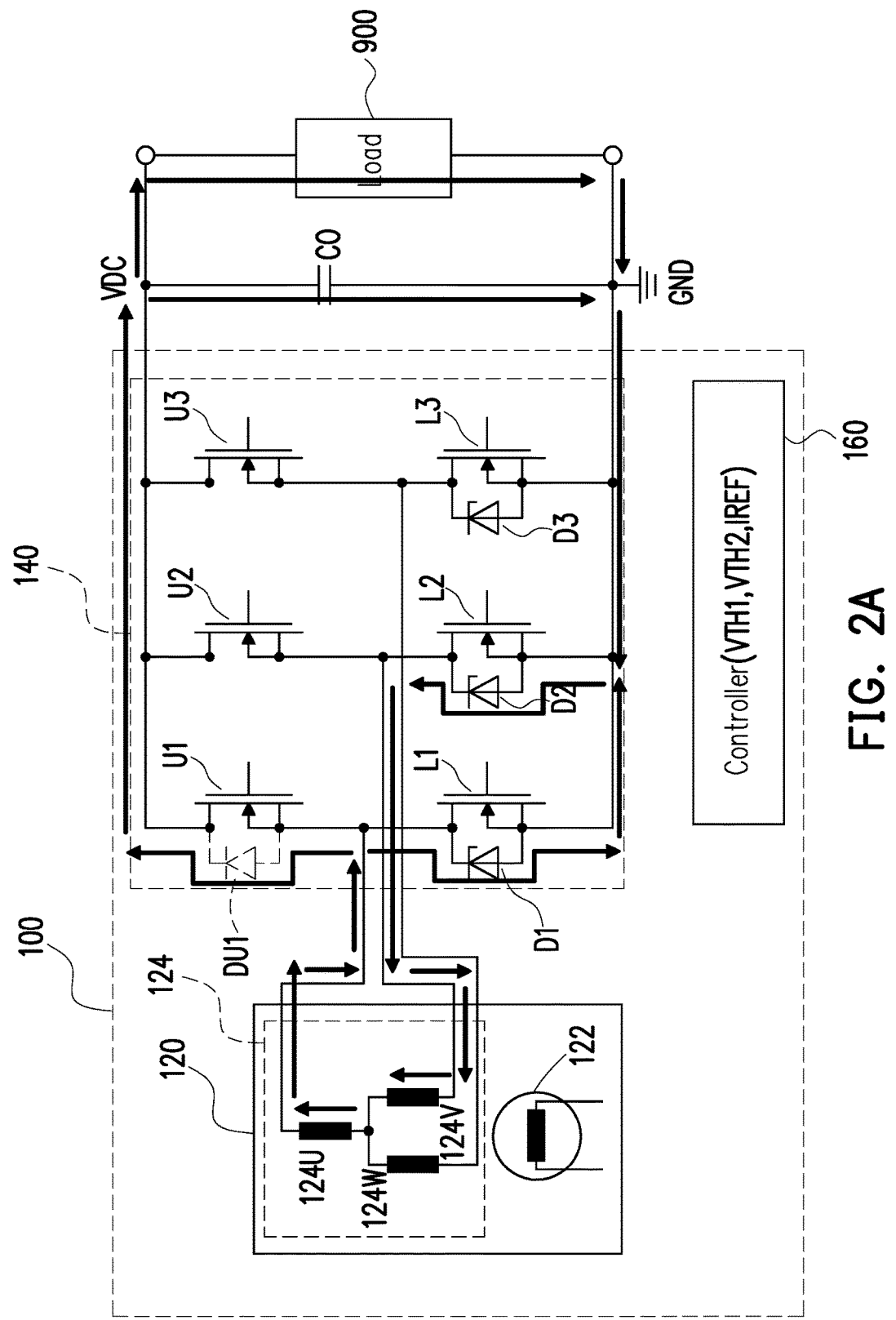
FIG. 2A is a schematic diagram illustrating power allocation when the load dump phenomenon occurs in the synchronous rectifier alternator shown in FIG. 1 according to an embodiment of the invention.
Figure 2B:
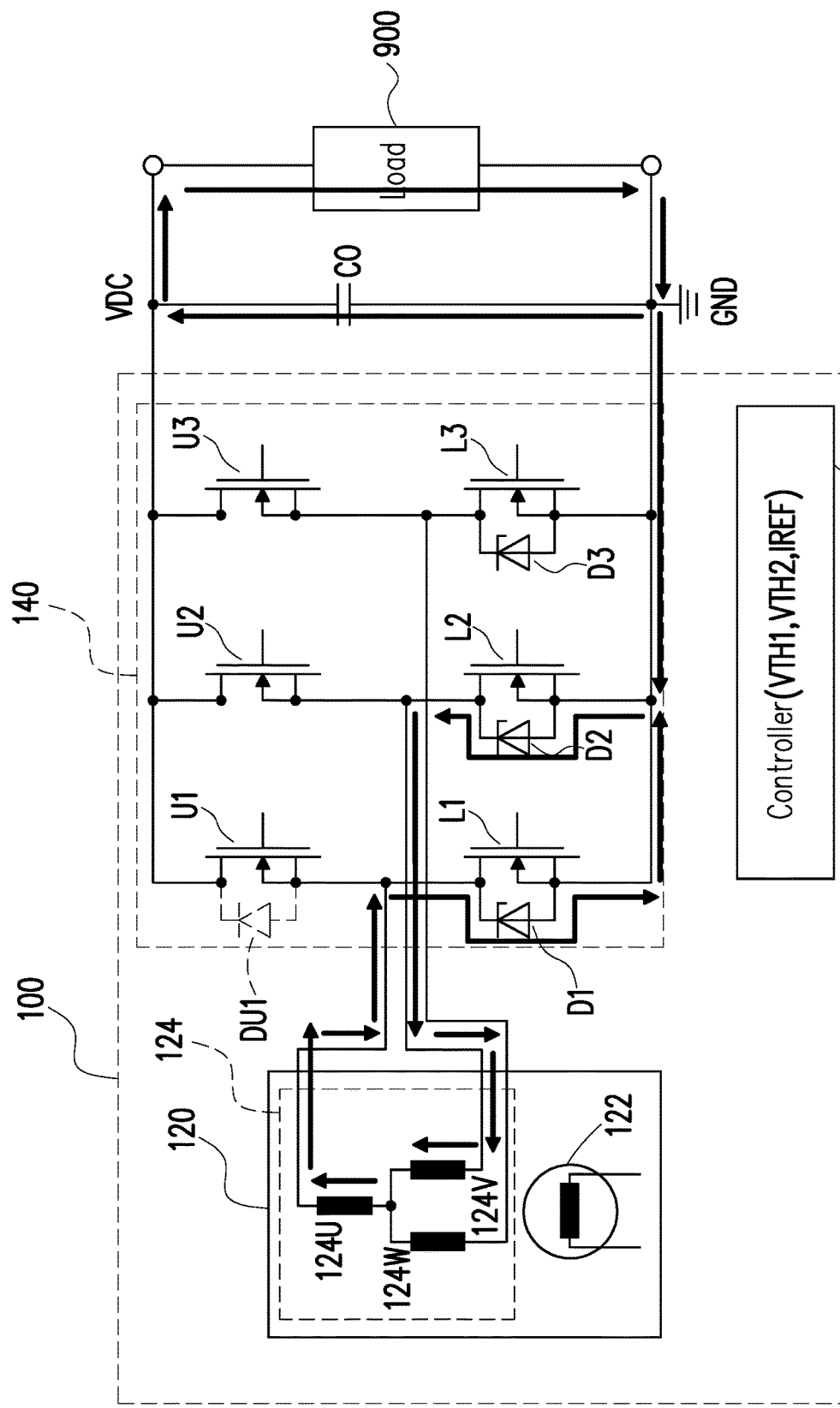
FIG. 2B is a schematic diagram illustrating power allocation when the load dump phenomenon occurs in the synchronous rectifier alternator shown in FIG. 1 according to an embodiment of the invention.

Referring to FIGS. 2A and 2B, FIG. 2A is a schematic diagram illustrating power allocation when the load dump phenomenon occurs in the synchronous rectifier alternator 100 shown in FIG. 1 according to an embodiment of the invention. In FIG. 2A, the controller 160 of the synchronous rectifier alternator 100 has not detected that the load dump phenomenon has already occurred in the synchronous rectifier alternator 100, and the arrows in the drawings indicate the directions of currents. Besides, for the purpose of simplicity, the coupling paths among the controller 160 and the first transistors L1 to L3 and the second transistors U1 to U3 are omitted in FIG. 2A. Specifically, when the load dump phenomenon occurs in the synchronous rectifier alternator 100, the voltage at the second end of the stator coil 124U (i.e., the cathode end of the regulator diode D1) is increased, and the voltage level VDC of the DC electrical energy output by the synchronous rectifier alternator 100 is also increased due to the forward-biased state of a parasitic diode DU1 at two ends of the second transistor U1. When the voltage at the cathode end of the regulator diode D1 is greater than or equal to the breakdown voltage and the regulator diode D1 is broken down, the voltage level VDC of the DC electrical energy is limited at a specific voltage. If the forward-biased voltage of the parasitic diode DU1 is neglected, the voltage level VDC of the DC electrical energy is limited at the breakdown voltage of the regulator diode D1. At this time, the power of the alternator 120 is consumed by the regulator diode D1 in the breakdown state, the regulator diode D2 in the forward-biased state, the stator 124 (i.e., the stator coils 124V and 124U) and the load 900. More specifically, a portion of the current output by the stator coil 124U flows to the output (parasitic) capacitor CO and the load 900 via the parasitic diode (in the forward-biased state) at the two ends of the second transistor U1, so as to consume a portion of the power of the alternator 120. Another portion of the current output by the stator coil 124U flows to the stator coil 124V through the regulator diode D1 in the breakdown state and the regulator diode D2 in the forward-biased state, so as to consume another portion of the power of the alternator 120.

Besides, if the voltage at the cathode end of the regulator diode D1 is lower than the sum of the forward-biased voltage of the parasitic diode DU1 and the voltage level VDC of the DC electrical energy, the parasitic diode DU1 is unable to be turned on. As a consequence, the current output by the stator coil 124U is unable to flow to the output (parasitic) capacitor CO and the load 900 through the parasitic diode DU1 (in the OFF state), as shown in FIG. 2B. At this time, the power required by the load 900 is provided by the output capacitor CO, for example, and the current output by the stator coil 124U flows to the stator coil 124V through the regulator diode D1 in the breakdown state and the regulator diode D2 in the forward-biased state, so as to consume the power of the alternator 120.

Figure 3A:
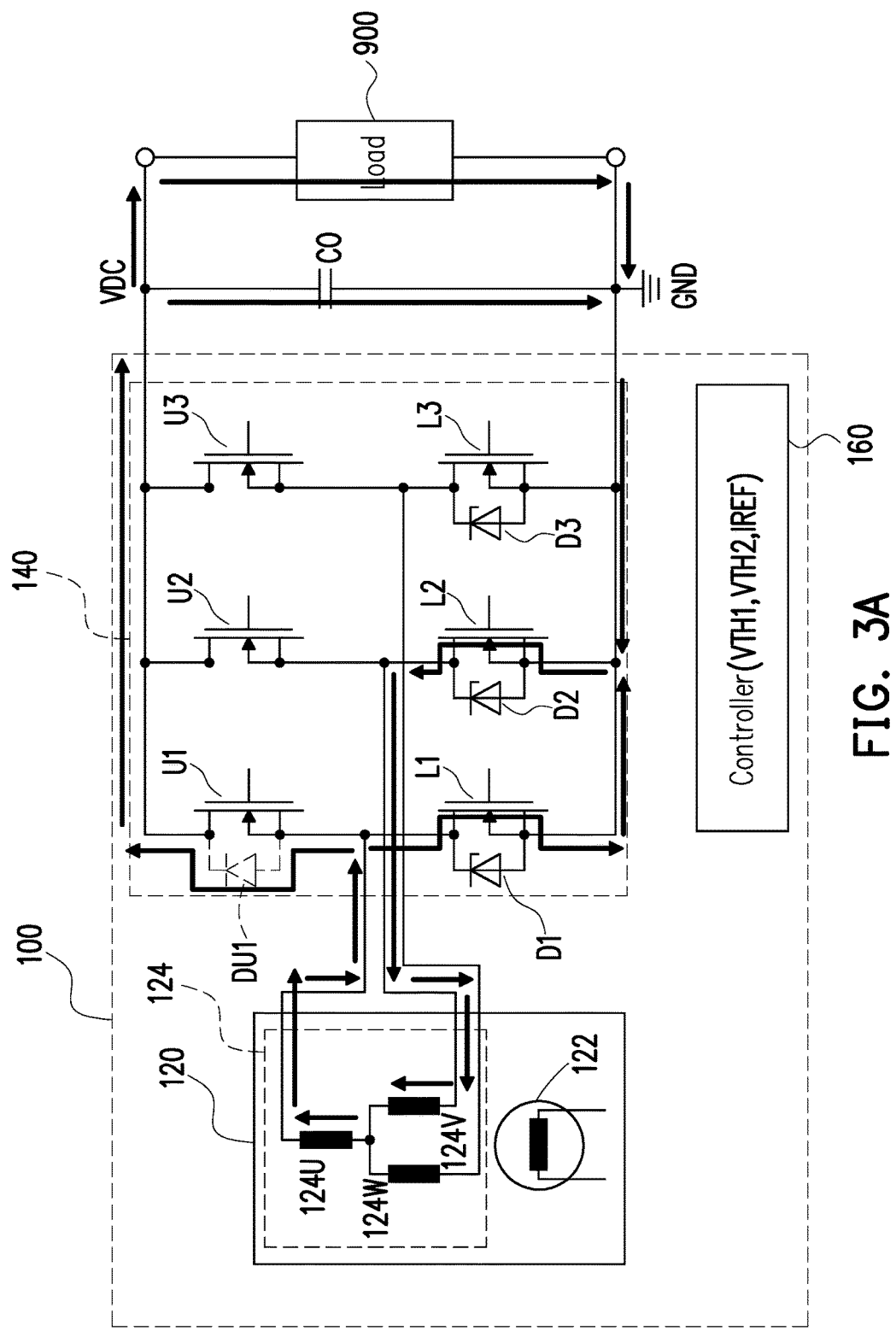
FIG. 3A is a schematic diagram illustrating power allocation of the synchronous rectifier alternator shown in FIG. 1 when a controller is operated under a cooling mode according to an embodiment of the invention.
Figure 3B:
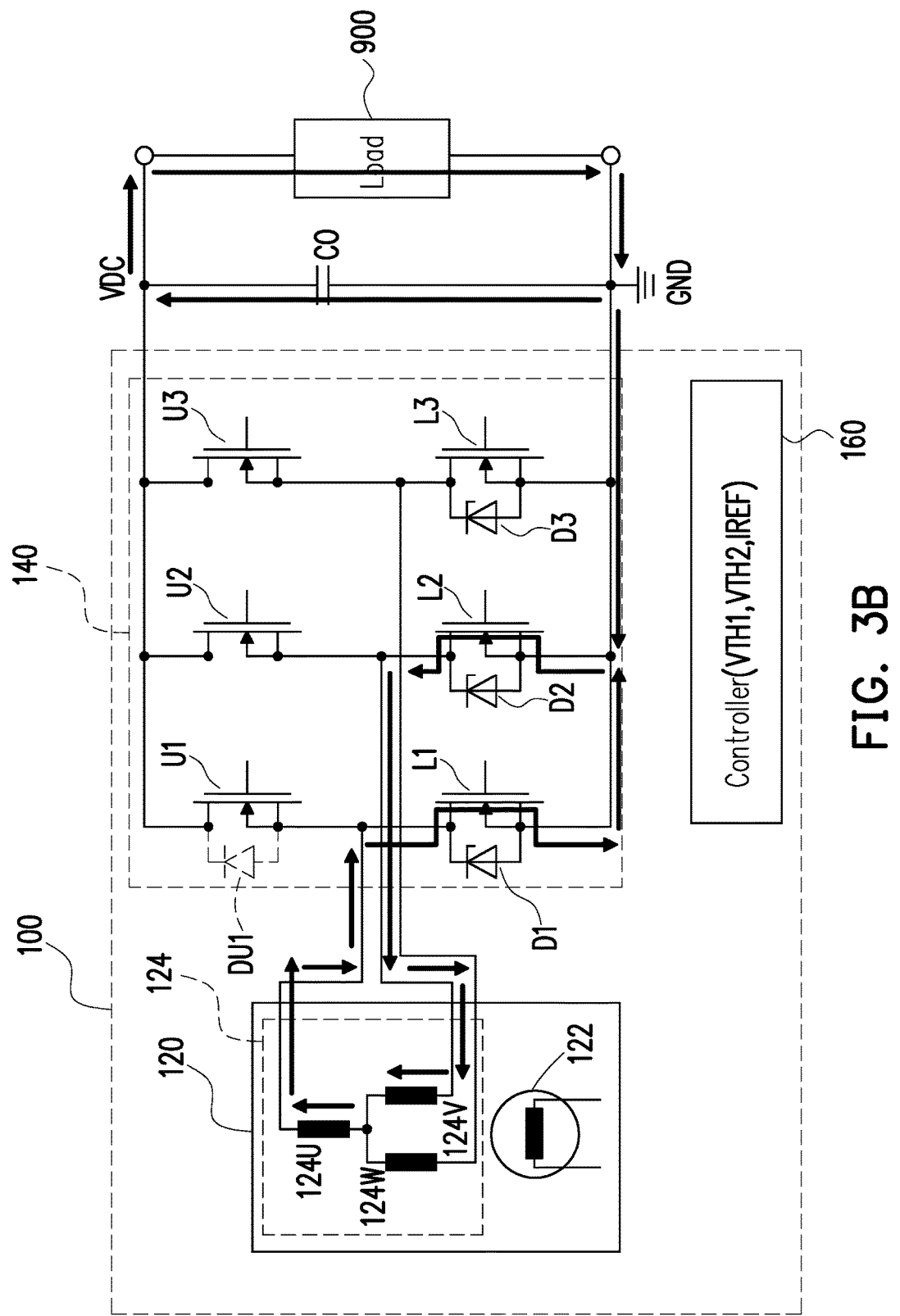
FIG. 3B is a schematic diagram illustrating power allocation of the synchronous rectifier alternator shown in FIG. 1 when the controller is operated under the cooling mode according to another embodiment of the invention.

Referring to FIGS. 3A and 3B, FIG. 3A is a schematic diagram illustrating power allocation of the synchronous rectifier alternator 100 shown in FIG. 1 when the controller 160 is operated under a cooling mode according to an embodiment of the invention. The arrows in the drawings indicate the directions of currents. Besides, for the purpose of simplicity, the coupling paths among the controller 160 and the first transistors L1 to L3 and the second transistors U1 to U3 are omitted in FIG. 3A. Specifically, when the controller 160 detects that the voltage level VDC of the DC electrical energy is higher than or equal to the first threshold voltage value VTH1, the controller 160 may determine that the load dump phenomenon has already occurred in the synchronous rectifier alternator 100. However, before the controller 160 determines that the load dump phenomenon occurs in the synchronous rectifier alternator 100, the regulator diode D1 may have already been operated in the breakdown condition and consuming the power of the alternator 120 for a specific period of time (due to a processing delay of the controller 160), and the temperature of the diode D1 is thus increased, such as the state shown in FIG. 2A or 2B. Therefore, the regulator diode D1 needs to be cooled off to prevent the regulator diode D1 from being damaged due to an excessively high temperature. Thus, when the controller 160 detects that the voltage level VDC of the DC electrical energy is higher than or equal to the first threshold voltage value VTH1, and the controller 160 predicts or detects that the regulator diode overheats, the controller 160 enters the cooling mode to turn on the first transistors L1 to L3 and turns off the second transistors U1 to U3 (or turns on the first transistor L1 in the reverse-biased state and the first transistor L2 in the forward-biased state and turns off the first transistor L3 and the second transistors U1 to U3), so that no current passes through the regulator diode D1 and the regulator diode D1 is cooled off. At this time, the stator 124 and the load 900 consume the power of the alternator 120. Specifically, a portion of the current output by the stator coil 124U flows to the output (parasitic) capacitor CO and the load 900 through the parasitic diode DU1 (in the forward-biased state) of the second transistor U1, so as to consume a portion of the power of the alternator 120. Another portion of the current output by the stator coil 124U flows to the stator coil 124V through the first transistor L1 in the ON state and the first transistor L2 in the ON state, so as to consume another portion of the power of the alternator 120. Since no current flows through the regulator diode D1, no power is consumed by the regulator diode D1, and the regulator diode D1 is thus cooled off.

Similarly, if the voltage at the cathode end of the regulator diode D1 is lower than the sum of the forward-biased voltage of the parasitic diode DU1 and the voltage level VDC of the DC electrical energy, the parasitic diode DU1 is unable to be turned on. As a consequence, the current output by the stator coil 124U is unable to flow to the output (parasitic) capacitor CO and the load 900 through the parasitic diode DU1 (in the OFF state) at the two ends of the second transistor U1, as shown in FIG. 3B. At this time, the power required by the load 900 is provided by the output (parasitic) capacitor CO, for example, and the current output by the stator coil 124U flows to the stator coil 124V through the first transistor L1 in the ON state and the first transistor L2 in the ON state, so that the stator 124 consumes the power of the alternator 120.

Figure 4A:
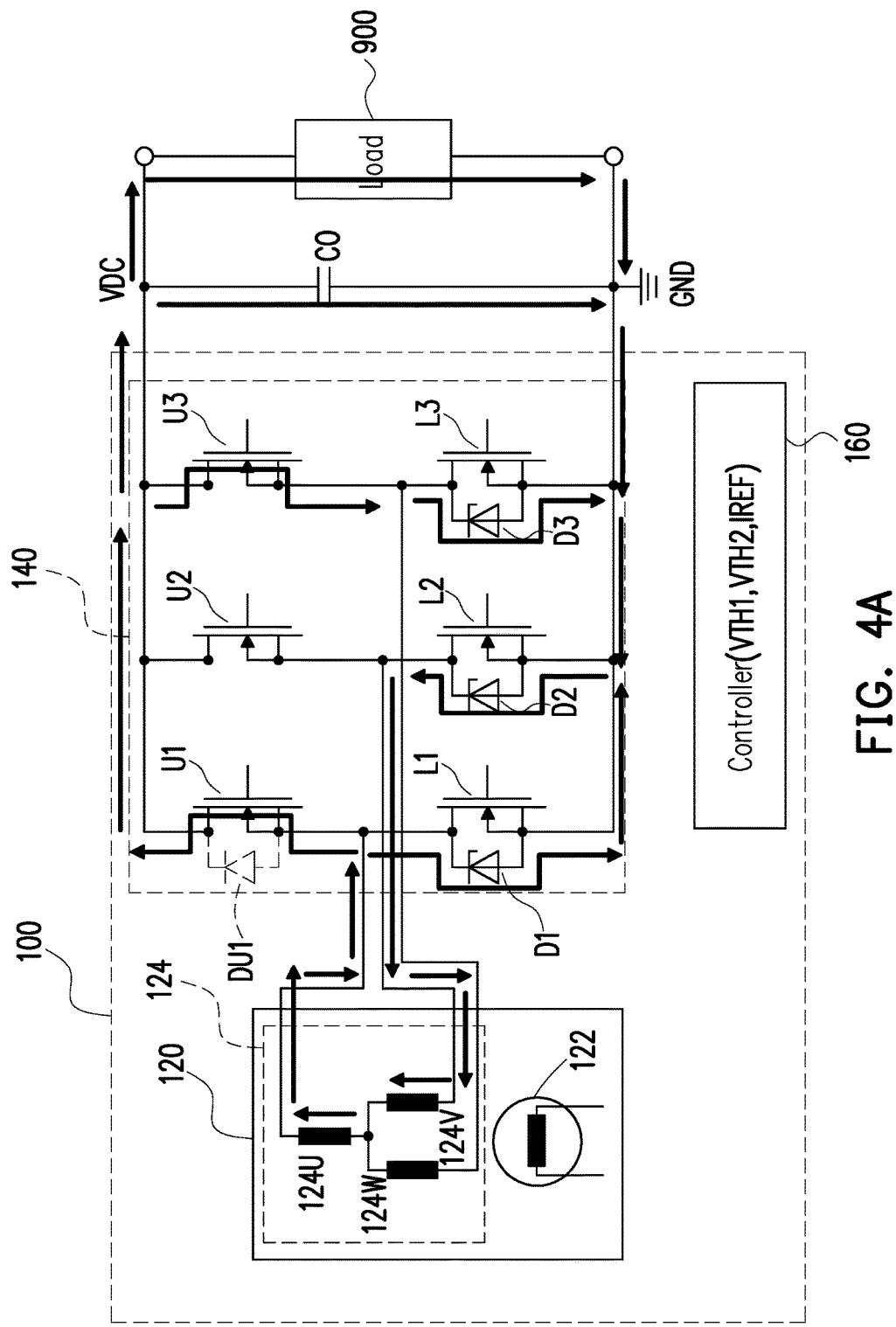
FIG. 4A is a schematic diagram illustrating power allocation of the synchronous rectifier alternator shown in FIG. 1 when the controller is operated under a first power allocation mode according to an embodiment of the invention.
Figure 4B:
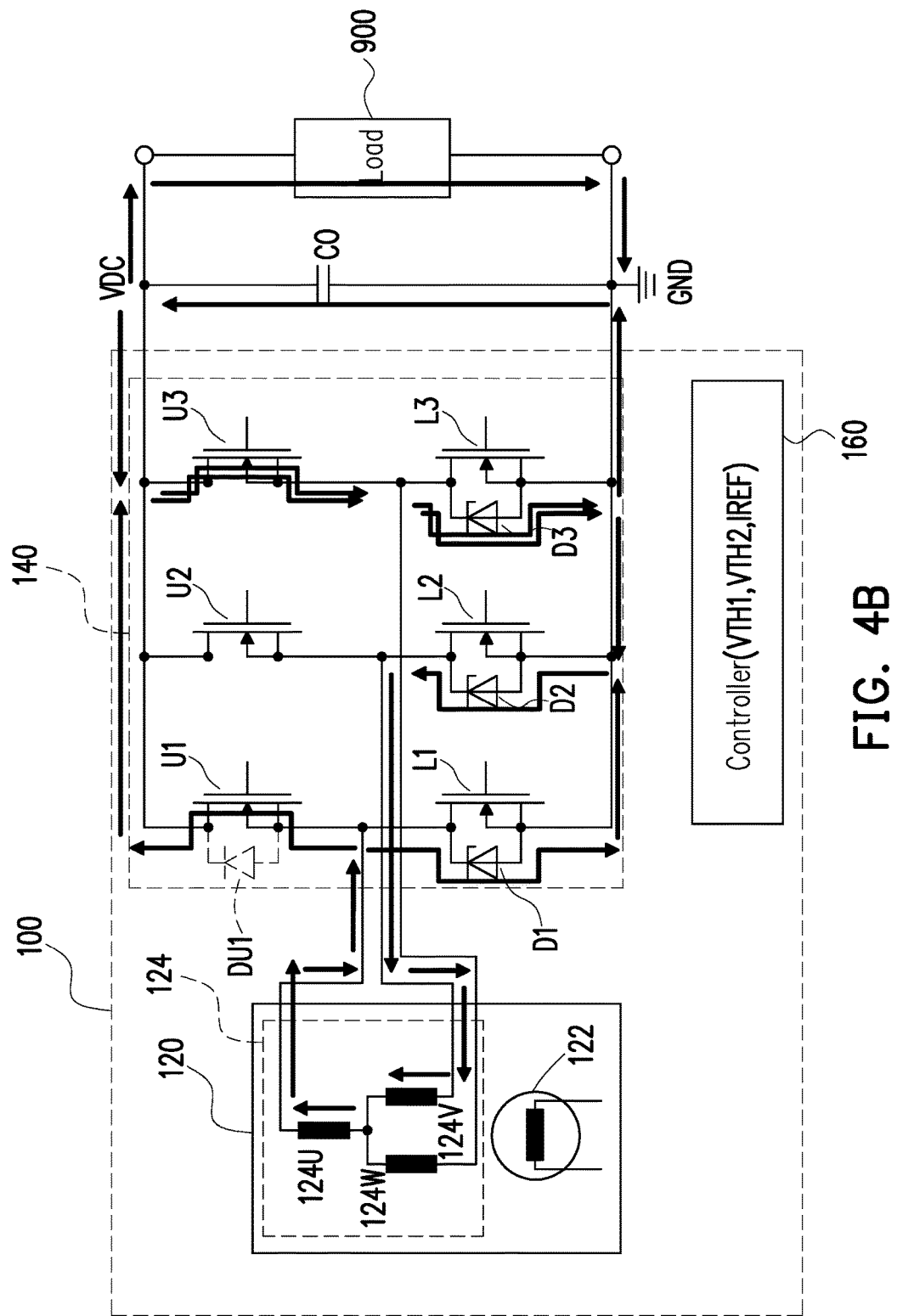
FIG. 4B is a schematic diagram illustrating power allocation of the synchronous rectifier alternator shown in FIG. 1 when the controller is operated under the first power allocation mode according to another embodiment of the invention.

Referring to FIGS. 4A and 4B, FIG. 4A is a schematic diagram illustrating power allocation of the synchronous rectifier alternator 100 shown in FIG. 1 when the controller 160 is operated under a first power allocation mode according to an embodiment of the invention. The arrows in the drawings indicate the directions of currents. Besides, for the purpose of simplicity, the coupling paths among the controller 160 and the first transistors L1 to L3 and the second transistors U1 to U3 are omitted in FIG. 4A. After the controller 160 enters the cooling mode and the regulator diode D1 is cooled off for a first time length, or when the controller 160 predicts or detects that the regulator diode D1 does not overheat under the cooling mode, if the voltage level VDC of the DC electrical energy is higher than or equal to the first threshold voltage value VTH1 for a second time length (i.e., the voltage level VDC of the DC electrical energy is still higher than or equal to the first threshold voltage value VTH1), and the current value of the stator 124 is greater than or equal to a reference current value IREF, the controller 160 enters the first power allocation mode, as shown in FIG. 4A, for example. At this time, the controller 160 may turn off the second transistor U2 which is in the reverse-biased state, turn on the rest second transistors U1 and U3, and turn off the first transistors L1 to L3. As a consequence, at least part of the regulator diodes D1 to D3, the stator 124, and the load 900 consume the power of the alternator 120.

Specifically, under the first power allocation mode shown in FIG. 4A, the power of the alternator 120 is consumed by the regulator diode D1 in the breakdown state, the regulator diode D3 in the breakdown state, the regulator diode D2 in the forward-biased state, the stator 124 (i.e., the stator coils 124V and 124U) and the load 900. More specifically, if the voltage at the cathode end of the regulator diode D1 is higher than the voltage level VDC of the DC electrical energy, a portion of the current output by the stator coil 124U may flow to the output (parasitic) capacitor CO, the load 900, the second transistor U3 in the ON state, and the regulator diode D3 in the breakdown state through the second transistor U1 in the ON state, and then flows to the stator coil 124V through the regulator diode D2 in the forward-biased state, so as to consume a portion of the power of the alternator 120. Another portion of the current output by the stator coil 124U flows to the stator coil 124V through the regulator diode D1 in the breakdown state and the regulator diode D2 in the forward-biased state, so as to consume another portion of the power of the alternator 120.

In an embodiment of the invention, the first transistor L2 in the forward-biased state in FIG. 4A may also be turned on, so that the first transistor L2 that is turned on may consume power in replacement of the forward-biased regulator diode D2. In another embodiment of the invention, the second transistor U1 in the forward-biased state of FIG. 4A may also be turned off, so that the parasitic diode DU1 of the second transistor U1 may consume power in replacement of the second transistor U1.

In an embodiment of the invention, when the controller 160 is operated under the first power allocation mode, if the voltage level VDC of the DC electrical energy is higher than the voltage at the cathode end of the regulator diode D1, the output (parasitic) capacitor CO is not only able to provide the power required by the load 900, but is also able to discharge the power via the second transistor U3 in the ON state and the regulator diode D3 in the breakdown state, as shown in FIG. 4B.

Figure 5:
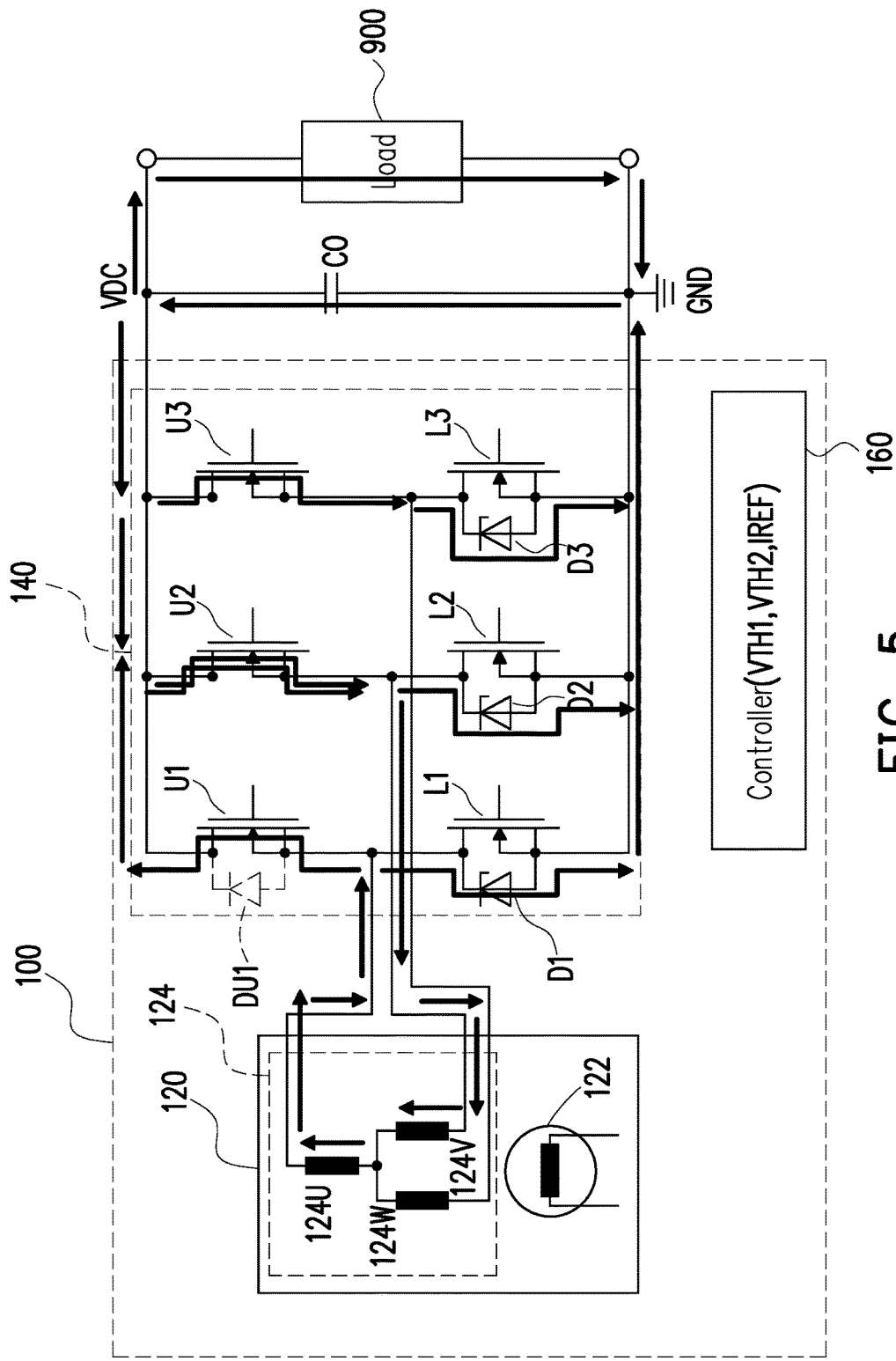
FIG. 5 is a schematic diagram illustrating power allocation of the synchronous rectifier alternator shown in FIG. 1 when the controller is operated under a second power allocation mode according to an embodiment of the invention.

Referring to FIG. 5, FIG. 5 is a schematic diagram illustrating power allocation of the synchronous rectifier alternator 100 shown in FIG. 1 when the controller 160 is operated under a second power allocation mode according to an embodiment of the invention. The arrows in the drawings indicate the directions of currents. Besides, for the purpose of simplicity, the coupling paths among the controller 160 and the first transistors L1 to L3 and the second transistors U1 to U3 are omitted in FIG. 5. After the controller 160 enters the cooling mode and the regulator diode D1 is cooled off for the first time length, or when the controller 160 predicts or detects that the regulator diode D1 does not overheat under the cooling mode, if the voltage level VDC of the DC electrical energy is higher than or equal to the first threshold voltage value VTH1 for the second time length (i.e., the voltage level VDC of the DC electrical energy is still higher than or equal to the first threshold voltage value VTH1), and the current value of the stator 124 is less than the reference current value IREF, the controller 160 enters the second power allocation mode, as shown in FIG. 5, for example. At this time, the controller 160 may turn on the second transistors U1 to U3, and turn off the first transistors L1 to L3, so that at least part of the regulator diodes D1 to D3, the stator 124, and the load 900 consume the power of the alternator 120.

Specifically, under the second power allocation mode shown in FIG. 5, the power of the alternator 120 is consumed by the regulator diodes D1 to D3 under the breakdown state, the stator 124 (i.e., the stator coils 124V and 124U), and the load 900. More specifically, a portion of the current output by the stator coil 124U flows to the stator coil 124V through the second transistors U1 and U2 in the ON state, so as to consume a portion of the power of the alternator 120. Another portion of the current output by the stator coil 124U flows to the ground voltage end GND through the regulator diode D1 in the breakdown state, so as to consume another portion of the power of the alternator 120. Besides, the output (parasitic) capacitor CO is not only able to provide the power required by the load 900, but is also able to discharge the power via the second transistor U2 in the ON state, the regulator diode D2 in the breakdown state, the second transistor U3 in the ON state, and the regulator diode D3 in the breakdown state.

Figure 6A:
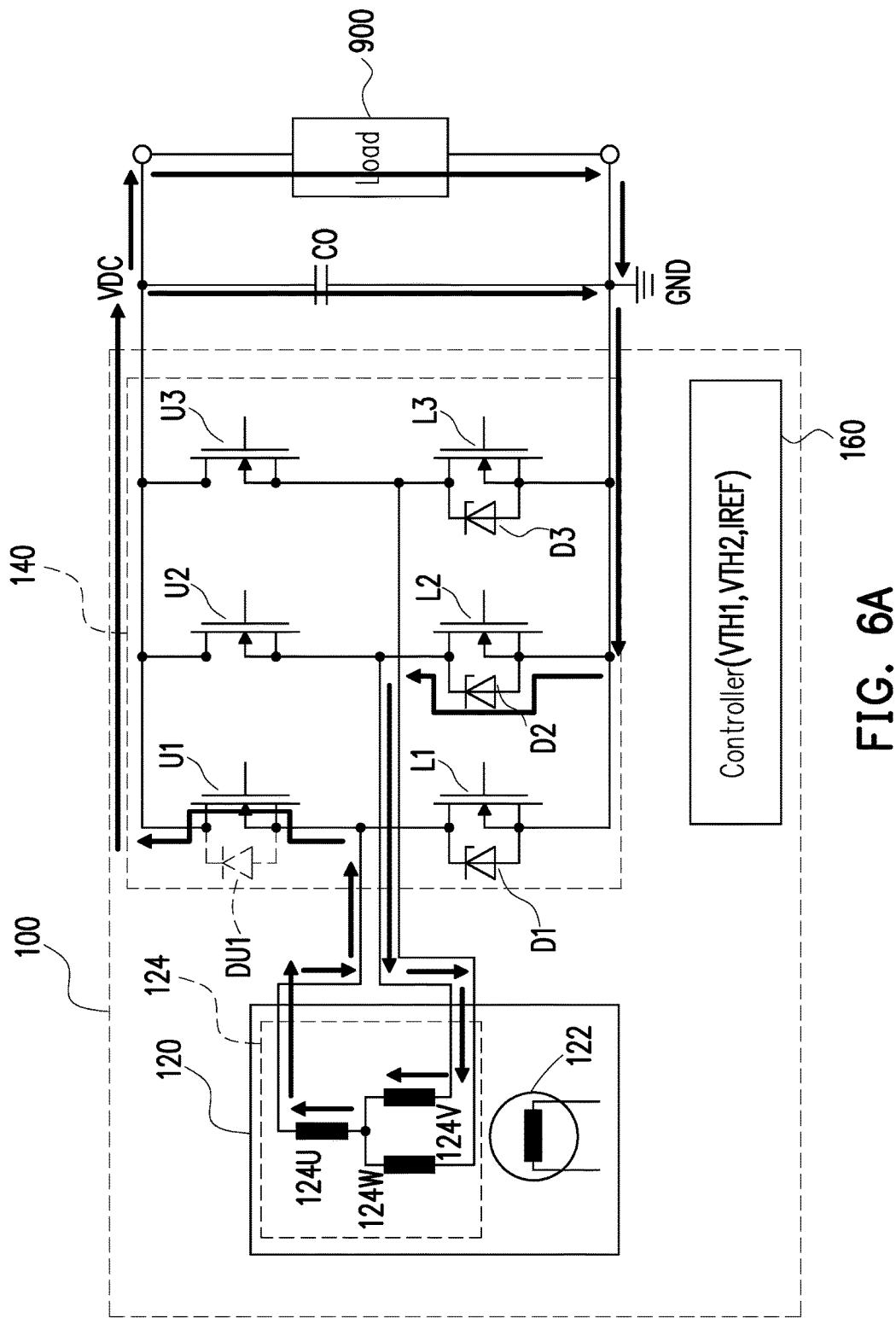
FIG. 6A is a schematic diagram illustrating power allocation of the synchronous rectifier alternator shown in FIG. 1 when the controller is operated under a third power allocation mode according to an embodiment of the invention.
Figure 6B:
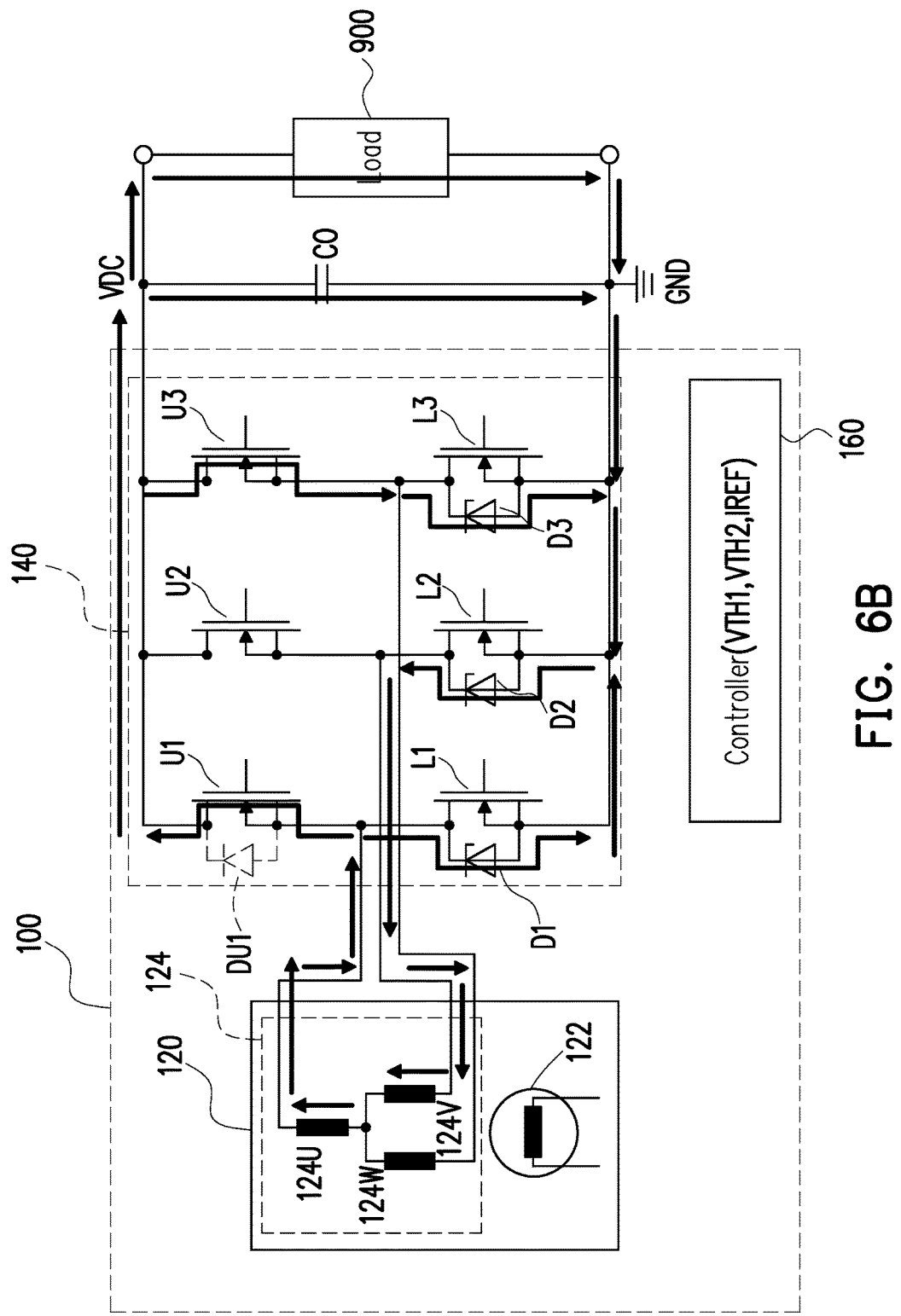
FIG. 6B is a schematic diagram illustrating power allocation of the synchronous rectifier alternator shown in FIG. 1 when the controller is operated under the third power allocation mode according to another embodiment of the invention.

Referring to FIGS. 6A and 6B, FIG. 6A is a schematic diagram illustrating power allocation of the synchronous rectifier alternator 100 shown in FIG. 1 when the controller 160 is operated under a third power allocation mode according to an embodiment of the invention. The arrows in the drawings indicate the directions of currents. Besides, for the purpose of simplicity, the coupling paths among the controller 160 and the first transistors L1 to L3 and the second transistors U1 to U3 are omitted in FIG. 6A. After the controller 160 enters the cooling mode and the regulator diode D1 is cooled off for the first time length, or when the controller 160 predicts or detects that the regulator diode D1 does not overheat under the cooling mode, if the voltage level VDC of the DC electrical energy is lower than the second threshold voltage VTH2, and the current value of the stator 124 is greater than or equal to the reference current value IREF, the controller 160 enters the third power allocation mode, as shown in FIG. 6A, for example. At this time, the controller 160 may turn off the second transistor U2 in the reverse-biased state, turn on the second transistors U1 and U3, and turn off the first transistors L1 to L3. As a consequence, at least part of the regulator diodes D1 to D3, the stator 124, and the load 900 consume the power of the alternator 120.

Specifically, under the third power allocation mode shown in FIG. 6A, the power of the alternator 120 is consumed by the regulator diode D2 in the forward-biased state, the stator 124 (i.e., the stator coils 124V and 124U), and the load 900. More specifically, the current output by the stator coil 124U flows to the output (parasitic) capacitor CO and the load 900 through the second transistor U1 in the ON state, and then flows to the stator coil 124V through the regulator diode D2 in the forward-biased state, so as to consume the power of the alternator 120. In an embodiment of the invention, the first transistor L2 in the forward-biased state in FIG. 6A may also be turned on, so that the first transistor L2 that is turned on may consume power in replacement of the regulator diode D2 in the forward-biased state, i.e., refraining the regulator diode D2 from consuming the power of the alternator 120.

In an embodiment of the invention, when the controller 160 is operated under the third power allocation mode, if the voltage level VDC of the DC electrical energy suddenly exceeds or reaches the first threshold voltage value VTH1, the regulator diodes D1 and D3 may be operated in the breakdown condition, as shown in FIG. 6B, for example. At this time, a portion of the current output by the stator coil 124U may flow to the output (parasitic) capacitor CO, the load 900, the second transistor U3 in the ON state, and the regulator diode D3 in the breakdown state through the second transistor U1 in the ON state, and then flows to the stator coil 124V through the regulator diode D2 in the forward-biased state, so as to consume a portion of the power of the alternator 120. Another portion of the current output by the stator coil 124U flows to the stator coil 124V through the regulator diode D1 in the breakdown state and the regulator diode D2 in the forward-biased state, so as to consume another portion of the power of the alternator 120.

Besides, the output (parasitic) capacitor CO shown in FIGS. 6A and 6B are in the charging state. However, the invention is not limited thereto. In other embodiments of the invention, the output (parasitic) capacitor CO may also be in the discharging state and supply power to the load 900.

Figure 7A:
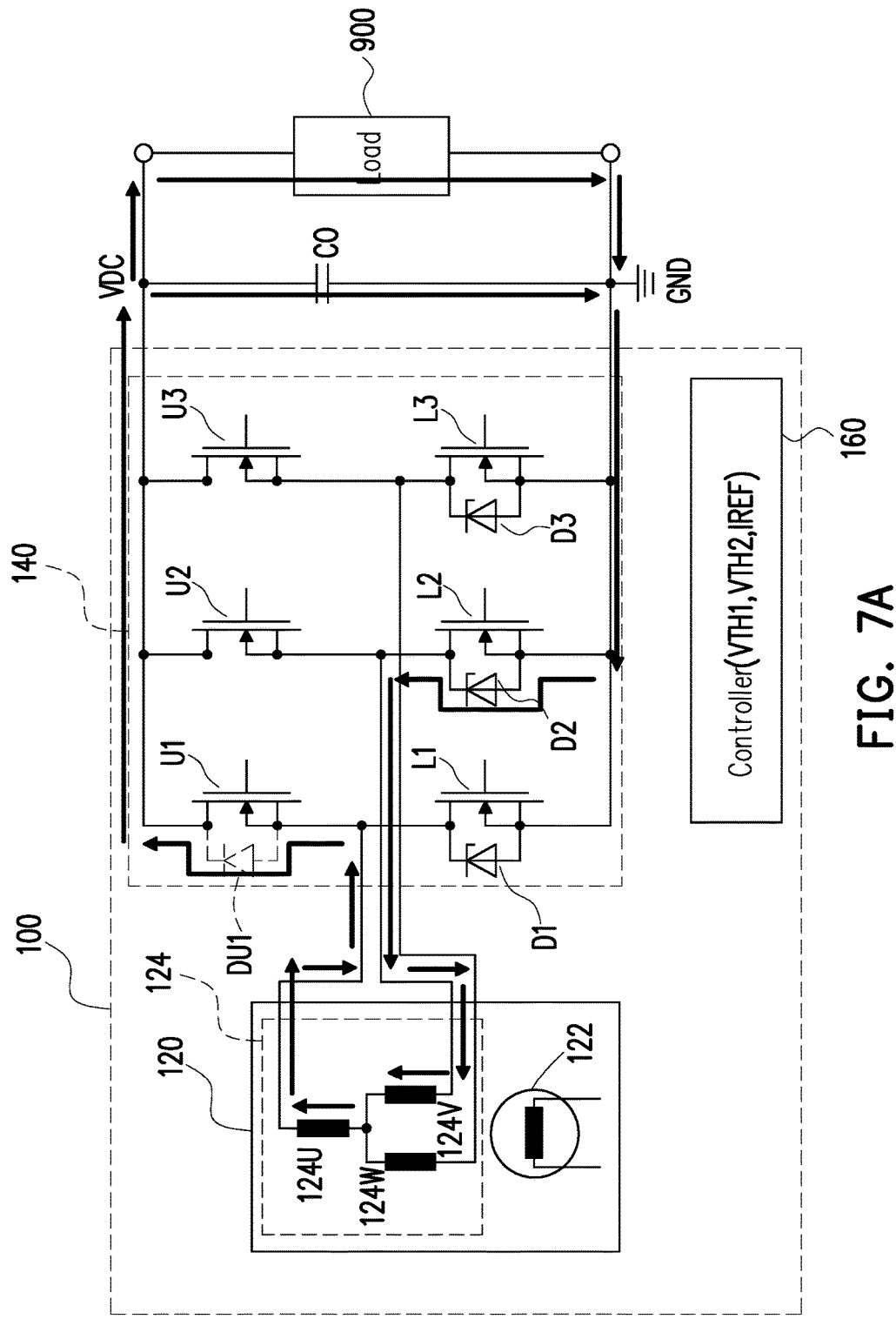
FIG. 7A is a schematic diagram illustrating power allocation of the synchronous rectifier alternator shown in FIG. 1 when the controller is operated under a fourth power allocation mode according to an embodiment of the invention.
Figure 7B:
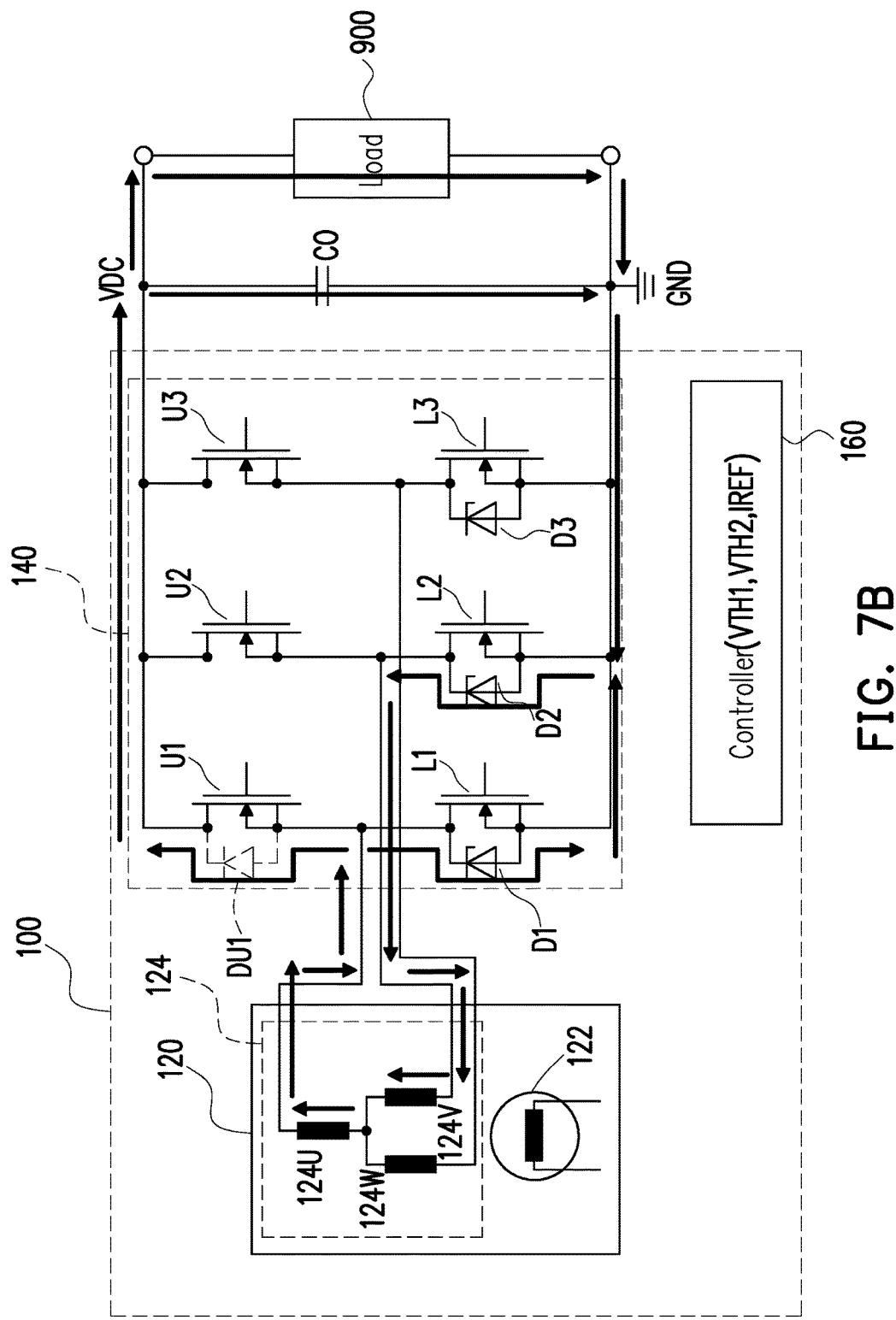
FIG. 7B is a schematic diagram illustrating power allocation of the synchronous rectifier alternator shown in FIG. 1 when the controller is operated under the fourth power allocation mode according to another embodiment of the invention.

Referring to FIGS. 7A and 7B, FIG. 7A is a schematic diagram illustrating power allocation of the synchronous rectifier alternator 100 shown in FIG. 1 when the controller 160 is operated under a fourth power allocation mode according to an embodiment of the invention. The arrows in the drawings indicate the directions of currents. Besides, for the purpose of simplicity, the coupling paths among the controller 160 and the first transistors L1 to L3 and the second transistors U1 to U3 are omitted in FIG. 7A. After the controller 160 enters the cooling mode and the regulator diode D1 is cooled off for the first time length, or when the controller 160 predicts or detects that the regulator diode D1 does not overheat under the cooling mode, if the voltage level VDC of the DC electrical energy is lower than the second threshold voltage VTH2, and the current value of the stator 124 is less than the reference current value IREF, the controller 160 enters the fourth power allocation mode, as shown in FIG. 7A, for example. At this time, the controller 160 may turn off the second transistors U1 to U3, and turn off the first transistors L1 to L3, so that at least part of the regulator diodes D1 to D3, the stator 124, and the load 900 consume the power of the alternator 120.

Specifically, under the fourth power allocation mode shown in FIG. 7A, the power of the alternator 120 is consumed by the regulator diode D2 in the forward-biased state, the stator 124 (i.e., the stator coils 124V and 124U), and the load 900. More specifically, the current output by the stator coil 124U flows to the output (parasitic) capacitor CO and the load 900 through the parasitic diode DU1 (in the forward-biased state) of the second transistor U1, and then flows to the stator coil 124V through the regulator diode D2 in the forward-biased state, so as to consume the power of the alternator 120. In an embodiment of the invention, the first transistor L2 in the forward-biased state in FIG. 7A may also be turned on, so that the first transistor L2 that is turned on may consume power in replacement of the regulator diode D2 in the forward-biased state, i.e., refraining the regulator diode D2 from consuming the power of the alternator 120.

In an embodiment of the invention, when the controller 160 is operated under the fourth power allocation mode of FIG. 7A, if the voltage level VDC of the DC electrical energy suddenly exceeds or reaches the first threshold voltage value VTH1, the regulator diode D1 may be operated in the breakdown condition, as shown in FIG. 7B, for example. At this time, a portion of the current output by the stator coil 124U flows to the output (parasitic) capacitor CO and the load 900 through the parasitic diode DU1 (in the forward-biased state) of the second transistor U1, and then flows to the stator coil 124V through the regulator diode D2 in the forward-biased state, so as to consume a portion of the power of the alternator 120. Another portion of the current output by the stator coil 124U flows to the stator coil 124V through the regulator diode D1 in the breakdown state and the regulator diode D2 in the forward-biased state, so as to consume another portion of the power of the alternator 120.

Besides, the output (parasitic) capacitor CO shown in FIGS. 7A and 7B are in the charging state. However, the invention is not limited thereto. In other embodiments of the invention, the output (parasitic) capacitor CO may also be in the discharging state and supply power to the load 900.

Figure 7C:
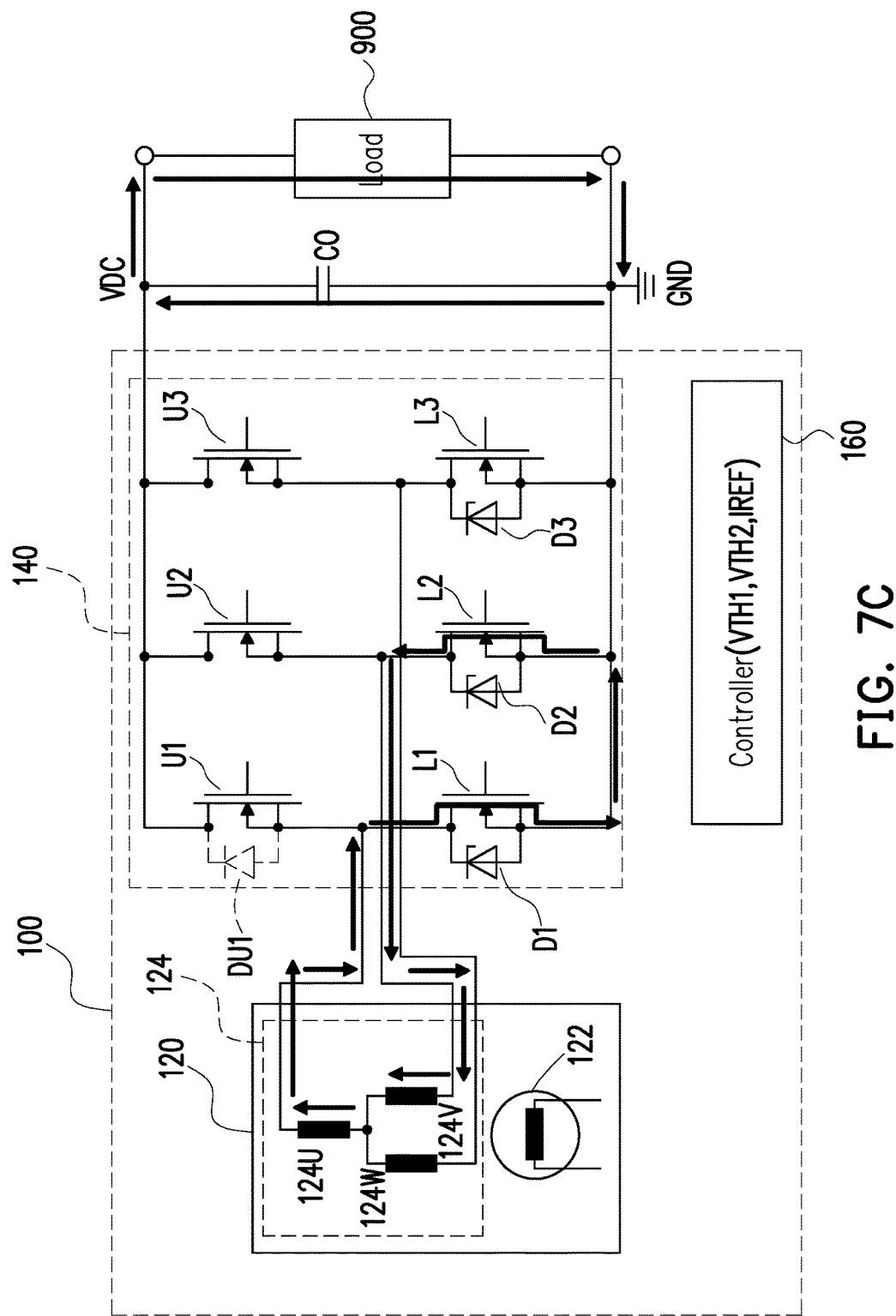
FIG. 7C is a schematic diagram illustrating power allocation of the synchronous rectifier alternator shown in FIG. 1 when the controller is operated under the fourth power allocation mode according to yet another embodiment of the invention.

Referring to FIG. 7C, FIG. 7C is a schematic diagram illustrating power allocation of the synchronous rectifier alternator 100 shown in FIG. 1 when the controller 160 is operated under the fourth power allocation mode according to an embodiment of the invention. The arrows in the drawings indicate the directions of currents. Besides, for the purpose of simplicity, the coupling paths among the controller 160 and the first transistors L1 to L3 and the second transistors U1 to U3 are omitted in FIG. 7C. After the controller 160 enters the cooling mode and the regulator diode D1 is cooled off for the first time length, or when the controller 160 predicts or detects that the regulator diode D1 does not overheat under the cooling mode, if the voltage level VDC of the DC electrical energy is lower than the second threshold voltage VTH2, and the current value of the stator 124 is less than the reference current value IREF, the controller 160 enters the fourth power allocation mode, as shown in FIG. 7C, for example. At this time, the controller 160 may turn off the second transistors U1 to U3, and turn on the first transistors L1 to L3, so that the stator 124 and part of the first transistors L1 to L3 consume the power of the alternator 120.

Specifically, under the fourth power allocation mode shown in FIG. 7C, the power of the alternator 120 is consumed by the first transistors L1 and L2 in the ON state and the stator 124 (i.e., the stator coils 124V and 124U), and the output (parasitic) capacitor CO is in the discharging state to supply power to the load 900. At this time, the power of the alternator 120 is not consumed through the regulator diodes D1 to D3.

Figure 7D:
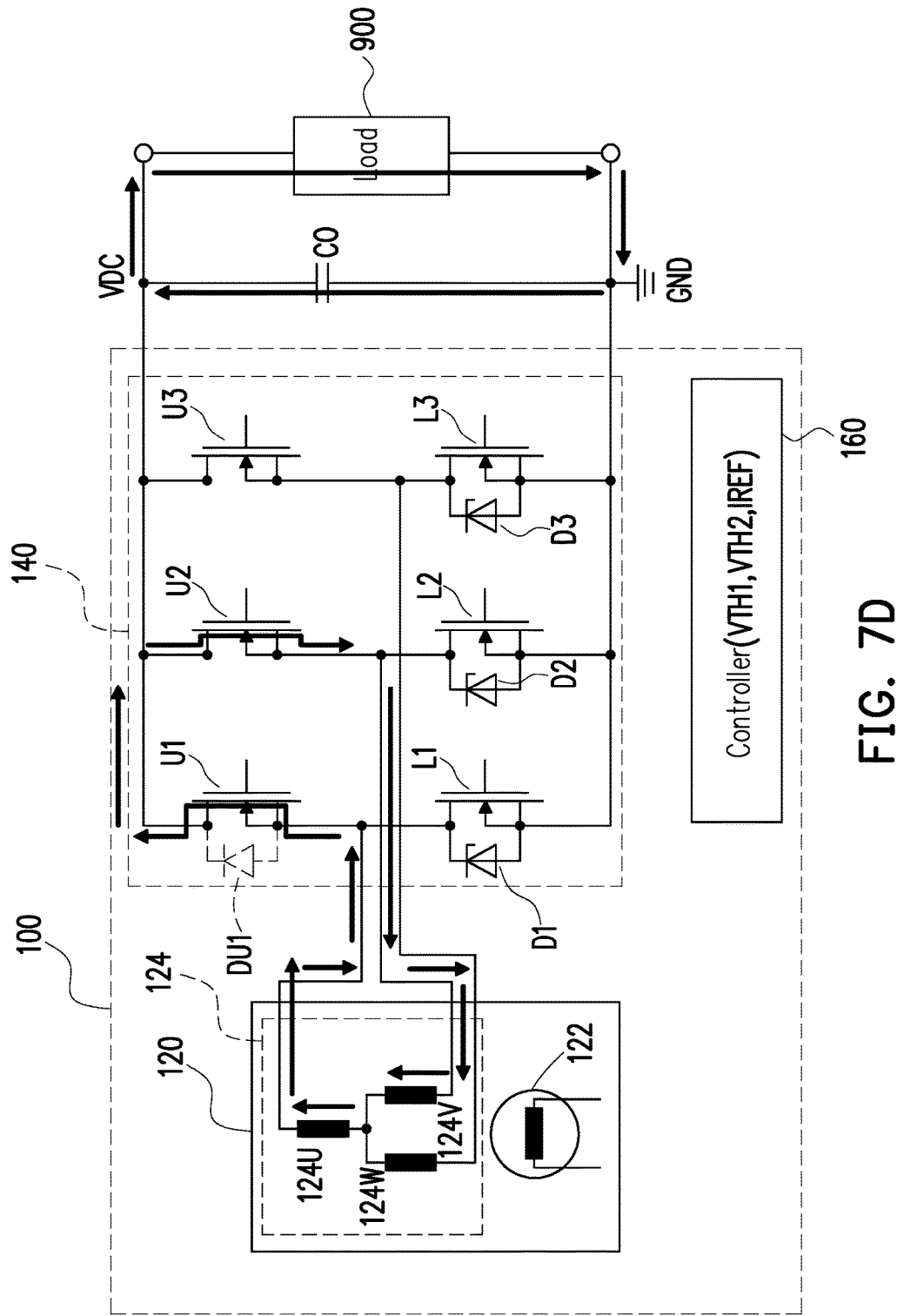
FIG. 7D is a schematic diagram illustrating power allocation of a synchronous rectifier alternator shown in FIG. 1 when a controller 160 is operated under the fourth power allocation mode according to yet another embodiment of the invention.

Referring to FIG. 7D, FIG. 7D is a schematic diagram illustrating power allocation of the synchronous rectifier alternator 100 shown in FIG. 1 when the controller 160 is operated under the fourth power allocation mode according to an embodiment of the invention. The arrows in the drawings indicate the directions of currents. Besides, for the purpose of simplicity, the coupling paths among the controller 160 and the first transistors L1 to L3 and the second transistors U1 to U3 are omitted in FIG. 7D. After the controller 160 enters the cooling mode and the regulator diode D1 is cooled off for the first time length, or when the controller 160 predicts or detects that the regulator diode D1 does not overheat under the cooling mode, if the voltage level VDC of the DC electrical energy is lower than the second threshold voltage VTH2, and the current value of the stator 124 is less than the reference current value IREF, the controller 160 enters the fourth power allocation mode, as shown in FIG. 7D, for example. At this time, the controller 160 may turn on the second transistors U1 to U3, and turn off the first transistors L1 to L3, so that the stator 124 and part of the second transistors U1 to U3 consume the power of the alternator 120.

Specifically, under the fourth power allocation mode shown in FIG. 7D, the power of the alternator 120 is consumed by the second transistors U1 and U2 in the ON state and the stator 124 (i.e., the stator coils 124V and 124U), and the output (parasitic) capacitor CO is in the discharging state to supply power to the load 900. At this time, the power of the alternator 120 is not consumed through the regulator diodes D1 to D3.

In the following, the transition among the cooling mode, the first power allocation mode, the second power allocation mode, the third power allocation mode, and the fourth power allocation mode is described in greater detail.

In an embodiment of the invention, under the first power allocation mode shown in FIG. 4A or 4B, if the voltage level VDC of the DC electrical energy is higher than or equal to the first threshold voltage value VTH1, and the current value of the stator 124 is less than the reference current value IREF, the controller 160 enters the second power allocation mode to turn on the second transistors U1 to U3 and turn off the first transistors L1 to L3, so that the power of the alternator 120 is consumed by the regulator diodes D1 to D3 in the breakdown state, the stator 124 (i.e., the stator coils 124V and 124U) and the load 900. The directions of currents inside the synchronous rectifier alternator 100 are as shown in FIG. 5, for example. Details regarding the operation under the second power allocation mode may be referred to relevant descriptions about FIG. 5 in the foregoing and will not be repeated in the following.

In an embodiment of the invention, under the first power allocation mode shown in FIG. 4A or 4B, if the voltage level VDC of the DC electrical energy is higher than or equal to the first threshold voltage value VTH1 for the second time length, the regulator diodes D1 and D3 have already been operated in the breakdown condition and consuming the power of the alternator 120 for the second time length. Therefore, the regulator diodes D1 and D3 need to be cooled off to prevent the regulator diodes D1 and D3 from being damaged due to an excessively high temperature. At this time, the controller 160 enters the cooling mode to turn on the first transistors L1 to L3 and turn off the second transistors U1 to U3 (or turn on the first transistor L1 in the reverse-biased state and the first transistor L2 in the forward-biased state and turn off the first transistor L3 and the second transistors U1 to U3), so that no current flows through the regulator diodes D1 to D3 and the regulator diodes D1 to D3 are cooled off. At this time, the power of the alternator 120 is consumed by the stator 124 and the load 900, and the directions of the currents inside the synchronous rectifier alternator 100 are as shown in FIG. 3A or 3B, for example. Details regarding the operation under the cooling mode may be referred to relevant descriptions about FIG. 3A or 3B in the foregoing and will not be repeated in the following.

In an embodiment of the invention, under the first power allocation mode shown in FIG. 4A or 4B, if the voltage level VDC of the DC electrical energy is less than the second threshold voltage value VTH2, and the current value of the stator 124 is greater than or equal to the reference current value IREF, the controller 160 enters the third power allocation mode to turn off the second transistor U2 in the reverse-biased state, turn on the second transistors U1 and U3, and turn off the first transistors L1 to L3, so that at least part of the regulator diodes D1 to D3, the stator 124, and the load 900 consume the power of the alternator 120. Details regarding the operation under the third power allocation mode may be referred to relevant descriptions about FIGS. 6A and 6B in the foregoing and will not be repeated in the following.

In an embodiment of the invention, under the first power allocation mode shown in FIG. 4A or 4B, if the voltage level VDC of the DC electrical energy is lower than the second threshold voltage value VTH2, and the current value of the stator 124 is less than the reference current value IREF, the controller 160 enters the fourth power allocation mode. Details regarding the operation under the fourth power allocation mode may be referred to relevant descriptions about FIGS. 7A and 7D in the foregoing and will not be repeated in the following.

In an embodiment of the invention, under the second power allocation mode shown in FIG. 5, if the voltage level VDC of the DC electrical energy is higher than or equal to the first threshold voltage value VTH1, and the current value of the stator 124 is greater than or equal to the reference current value IREF, the controller 160 enters the first power allocation mode to turn off the second transistor U2 which is in the reversed-biased state, turn on the rest second transistors U1 and U3, and turn off the first transistors L1 to L3, so that the power of the alternator 120 is consumed by the regulator diode D1 in the breakdown state, the regulator diode D3 in the breakdown state, the regulator diode D2 in the forward-biased state, the stator 124 (i.e., the stator coils 124V and 124U) and the load 900. Details regarding the operation under the first power allocation mode may be referred to relevant descriptions about FIGS. 4A and 4B and will not be repeated in the following.

In an embodiment of the invention, under the second power allocation mode shown in FIG. 5, if the voltage level VDC of the DC electrical energy is higher than or equal to the first threshold voltage value VTH1 for the second time length, the regulator diodes D1 to D3 have already been operated in the breakdown condition and consuming the power of the alternator 120 for the second time length. Therefore, the regulator diodes D1 to D3 need to be cooled off, so as to prevent the regulator diodes D1 to D3 from being damaged due to an excessively high temperature. At this time, the controller 160 enters the cooling mode. Details regarding the operation under the cooling mode may be referred to relevant descriptions about FIGS. 3A and 3B in the foregoing and will not be repeated in the following.

In an embodiment of the invention, under the second power allocation mode shown in FIG. 5, if the voltage level VDC of the DC electrical energy is lower than the second threshold voltage value VTH2, and the current value of the stator 124 is greater than or equal to the reference current value IREF, the controller 160 enters the third power allocation mode. Details regarding the operation under the third power allocation mode may be referred to relevant descriptions about FIGS. 6A and 6B in the foregoing and will not be repeated in the following.

In an embodiment of the invention, under the second power allocation mode shown in FIG. 5, if the voltage level VDC of the DC electrical energy is lower than the second threshold voltage value VTH2, and the current value of the stator 124 is less than the reference current value IREF, the controller 160 enters the fourth power allocation mode. Details regarding the operation under the fourth power allocation mode may be referred to relevant descriptions about FIGS. 7A and 7D in the foregoing and will not be repeated in the following.

In an embodiment of the invention, under the third power allocation mode shown in FIG. 6A or 6B, if the voltage level VDC of the DC electrical energy is higher than or equal to the first threshold voltage value VTH1 for the second time length, part of the regulator diodes D1 to D3 have already been consuming the power of the alternator 120 for the second time length. Therefore, the regulator diodes D1 to D3 need to be cooled off, so as to prevent the regulator diodes D1 to D3 from being damaged due to an excessively high temperature. At this time, the controller 160 enters the cooling mode. Details regarding the operation under the cooling mode may be referred to relevant descriptions about FIGS. 3A and 3B in the foregoing and will not be repeated in the following.

In an embodiment of the invention, under the third power allocation mode shown in FIG. 6A or 6B, if the voltage level VDC of the DC electrical energy is lower than the second threshold voltage value VTH2, and the current value of the stator 124 is less than the reference current value IREF, the controller 160 enters the fourth power allocation mode. Details regarding the operation under the fourth power allocation mode may be referred to relevant descriptions about FIGS. 7A and 7D in the foregoing and will not be repeated in the following.

In an embodiment of the invention, under the fourth power allocation mode shown in any of FIGS. 7A to 7D, if the voltage level VDC of the DC electrical energy is higher than or equal to the first threshold voltage VTH1 for the second time length, the controller 160 enters the cooling mode to cool off the regulator diodes D1 to D3, so as to prevent the regulator diodes D1 to D3 from being damaged due to an excessively high temperature. Details regarding the operation under the cooling mode may be referred to relevant descriptions about FIGS. 3A and 3B in the foregoing and will not be repeated in the following.

In an embodiment of the invention, under the fourth power allocation mode shown in any one of FIGS. 7A to 7D, if the voltage level VDC of the DC electrical energy is lower than the second threshold voltage value VTH2, and the current value of the stator 124 is greater than or equal to the reference current value IREF, the controller 160 enters the third power allocation mode. Details regarding the operation under the third power allocation mode may be referred to relevant descriptions about FIGS. 6A and 6B in the foregoing and will not be repeated in the following.

In an embodiment of the invention, under the fourth power allocation mode shown in any one of FIGS. 7A to 7D, if the voltage level VDC of the DC electrical energy is lower than the second threshold voltage value VTH2, and the current value of the stator 124 is less than the reference current value IREF, the power of the alternator 120 has been fully consumed. Therefore, the controller 160 may enter a normal operation mode. Under the normal operation mode, the controller 160 may control the ONs and OFFs of the first transistors L1 to L3 and the second transistors U1 to U3 based on the power requirements of the load 900, so as to rectify the AC electrical energy of the alternator 120 into the DC electrical energy.

Figure 8:
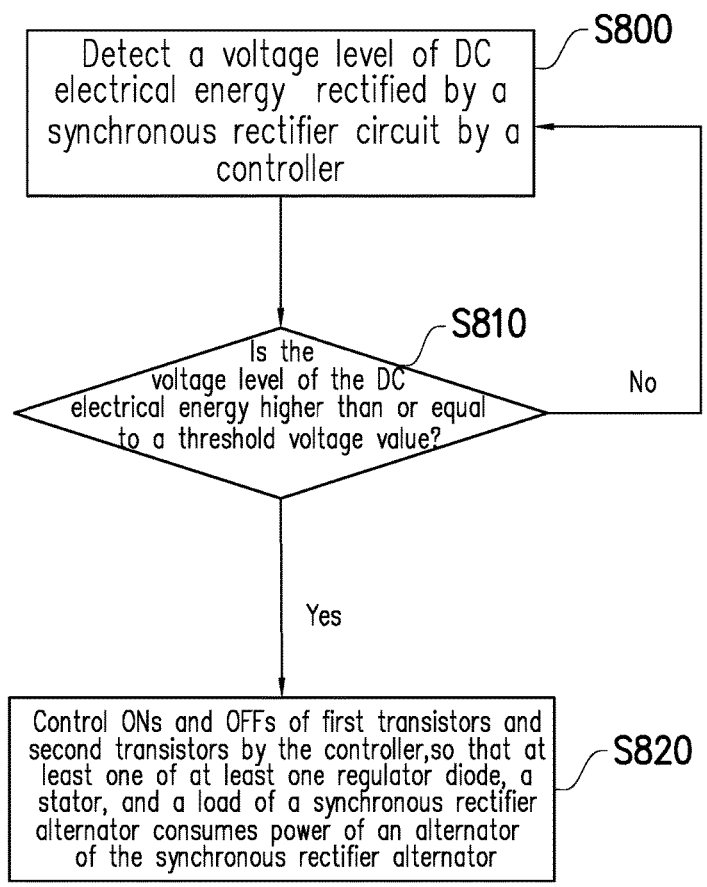
FIG. 8 is a schematic flowchart illustrating a power allocation method of a synchronous rectifier alternator according to an embodiment of the invention.

Referring to FIGS. 1 and 8, FIG. 8 is a schematic flowchart illustrating a power allocation method of a synchronous rectifier alternator according to an embodiment of the invention. The method shown in FIG. 8 is suitable for the synchronous rectifier alternator 100 shown in FIG. 1. However, the invention is not limited thereto. First of all, at Step S800, the voltage level VDC of the DC electrical energy rectified by the synchronous rectifier circuit 140 is detected by the controller 160. Then, at Step S810, whether the voltage level VDC is higher than or equal to the first threshold voltage value VTH1 is determined by the controller 160 to obtain a result of determination. If the result of determination at Step S810 is NO, the flow returns to Step S800. Alternatively, if the result of determination at Step S810 is YES, the ONs and OFFs of the first transistors L1 to L3 and the second transistors U1 to U3 are controlled by the controller 160, so that at least one of at least one of the regulator diodes D1 to D3, the stator 124, and the load 900 of the synchronous rectifier alternator 100 consumes the power of the alternator 120, as shown in Step S820.

Besides, sufficient teaching, suggestions and embodying descriptions about the implementing details of the power allocation method of the synchronous rectifier alternator according to the embodiment of the invention can be directed to the descriptions for the embodiments shown in FIGS. 1 to 7D and thus will not be repeated in the following.

In view of the foregoing, in the synchronous rectifier alternator and the power allocation method of the synchronous rectifier alternator according to the embodiments of the invention, when the load dump phenomenon occurs in the synchronous rectifier alternator, the power of the alternator is jointly drained away or consumed by at least one of the regulator diode, the stator, and the load, so as to avoid the issue that the temperature of the regulator diode is too high when the power of the alternator is consumed only by the regulator diode in the breakdown state, and the issue that the temperature of the stator is too high and the time for power consumption is too long when the power of the alternator is consumed only by the stator. Therefore, the synchronous rectifier alternator and the power allocation method of the synchronous rectifier alternator according to the embodiments of the invention are capable of quickly and safely draining away or consuming the power of the alternator and limiting the DC voltage output by the rectifier circuit, so as to protect the components of the synchronous rectifier alternator or the load when the load dump phenomenon occurs.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A synchronous rectifier alternator, providing direct current (DC) electrical energy to a load and comprising:
   an alternator, having a rotor and a stator, and converting mechanical energy into alternating current (AC) electrical energy, wherein the stator has a plurality of stator coils;
   a synchronous rectifier circuit, electrically connected to the stator and converting the AC electrical energy into the DC electrical energy, the synchronous rectifier circuit comprising:
      a plurality of first transistors, wherein each of the first transistors is coupled between one of the stator coils and a first end of the load;
      a plurality of second transistors, wherein each of the second transistors is coupled between one of the stator coils and a second end of the load; and
      at least one regulator diode, wherein each of the at least one regulator diode is coupled to two ends of one of the first transistors and the second transistors to limit a voltage level of the DC electrical energy; and
   a controller, coupled to the synchronous rectifier circuit to detect the voltage level of the DC electrical energy, and controlling ONs and OFFs of the first transistors and the second transistors when detecting that the voltage level of the DC electrical energy is higher than or equal to a first threshold voltage value, such that at least one of at least part of the at least one regulator diode, the stator, and the load consumes power of the alternator.

2. The synchronous rectifier alternator as claimed in claim 1, wherein when the controller detects that the voltage level of the DC electrical energy is higher than or equal to the first threshold voltage value, and the controller predicts or detects that the at least one regulator diode does not overheat, the controller controls the ONs and OFFs of the first transistors and the second transistors, such that the at least one regulator diode consumes the power of the alternator.

3. The synchronous rectifier alternator as claimed in claim 2, wherein when the controller detects that the voltage level of the DC electrical energy is lower than a second threshold voltage value, the at least one regulator diode is refrained from consuming the power of the alternator, wherein the first threshold voltage value is greater than or equal to the second threshold voltage value.

4. The synchronous rectifier alternator as claimed in claim 1, wherein when the controller detects that the voltage level of the DC electrical energy is higher than or equal to the first threshold voltage value, and the controller predicts or detects that the at least one regulator diode overheats, the controller controls the ONs and OFFs of the first transistors and the second transistors, such that the stator consumes the power of the alternator, or such that the stator and the load consume the power of the alternator.

5. The synchronous rectifier alternator as claimed in claim 4, wherein when the controller detects that the voltage level of the DC electrical energy is still higher than or equal to the first threshold voltage value, and the controller predicts or detects that the at least one regulator diode does not overheat, the controller controls the ONs and OFFs of the first transistors and the second transistors, such that the at least one regulator diode consumes the power of the alternator.

6. The synchronous rectifier alternator as claimed in claim 5, wherein when the controller detects that the voltage level of the DC electrical energy is lower than a second threshold voltage value, the at least one regulator diode is refrained from consuming the power of the alternator, wherein the first threshold voltage value is greater than or equal to the second threshold voltage value.

7. The synchronous rectifier alternator as claimed in claim 4, wherein after the at least one regulator diode is cooled off for a first time length, and the controller detects that the voltage level of the DC electrical energy is still higher than or equal to the first threshold voltage value, the controller controls the ONs and OFFs of the first transistors and the second transistors, such that the at least one regulator diode consumes the power of the alternator.

8. The synchronous rectifier alternator as claimed in claim 7, wherein when the controller detects that the voltage level of the DC electrical energy is lower than a second threshold voltage value, the at least one regulator diode is refrained from consuming the power of the alternator, wherein the first threshold voltage value is greater than or equal to the second threshold voltage value.

9. A power allocation method of a synchronous rectifier alternator comprising an alternator, a synchronous rectifier circuit, and a controller, wherein the method comprises:
    detecting, by the controller, a voltage level of direct current (DC) electrical energy rectified by the synchronous rectifier circuit;
    determining whether the voltage level of the DC electrical energy is higher than or equal to a first threshold voltage value by the controller, so as to obtain a result of determination;
    controlling ONs and OFFs of a plurality of first transistors and a plurality of second transistors of the synchronous rectifier circuit by the controller if the result of determination is YES, such that at least one of at least one regulator diode of the synchronous rectifier circuit, a stator of the alternator, and a load of the synchronous rectifier alternator consumes power of the alternator.

10. The power allocation method of the synchronous rectifier alternator as claimed in claim 9, wherein controlling the ONs and OFFs of the first transistors and the second transistors of the synchronous rectifier circuit by the controller comprises:
    predicting or detecting whether the at least one regulator diode overheats by the controller; and
    controlling the ONs and OFFs of the first transistors and the second transistors by the controller if the at least one regulator diode does not overheat, such that the at least one regulator diode consumes the power of the alternator.

11. The power allocation method of the synchronous rectifier alternator as claimed in claim 10, wherein controlling the ONs and OFFs of the first transistors and the second transistors of the synchronous rectifier circuit by the controller further comprises:
    detecting whether the voltage level of the DC electrical energy is lower than a second threshold voltage value by the controller; and
    controlling the ONs and OFFs of the first transistors and the second transistors of the synchronous rectifier circuit by the controller if the voltage level of the DC electrical energy is lower than the second threshold voltage value, such that the at least one regulator diode is refrained from consuming the power of the alternator, wherein the first threshold voltage value is greater than or equal to the second threshold voltage value.

12. The power allocation method of the synchronous rectifier alternator as claimed in claim 9, wherein controlling the ONs and OFFs of the first transistors and the second transistors of the synchronous rectifier circuit by the controller comprises:
    predicting or detecting whether the at least one regulator diode overheats by the controller; and
    controlling the ONs and OFFs of the first transistors and the second transistors by the controller if the at least one regulator diode overheats, such that the stator consumes the power of the alternator or the stator and the load consume the power of the alternator.

13. The power allocation method of the synchronous rectifier alternator as claimed in claim 12, wherein controlling the ONs and OFFs of the first transistors and the second transistors of the synchronous rectifier circuit by the controller further comprises:
    controlling the ONs and OFFs of the first transistors and the second transistors by the controller if the voltage level of the DC electrical energy is still higher than or equal to the first threshold voltage value and the at least one regulator diode does not overheat, such that the at least one regulator diode consumes the power of the alternator.

14. The power allocation method of the synchronous rectifier alternator as claimed in claim 13, wherein controlling the ONs and OFFs of the first transistors and the second transistors of the synchronous rectifier circuit by the controller further comprises:
    detecting whether the voltage level of the DC electrical energy is lower than a second threshold voltage value by the controller; and
    controlling the ONs and OFFs of the first transistors and the second transistors of the synchronous rectifier circuit by the controller if the voltage level of the DC electrical energy is lower than the second threshold voltage value, such that the at least one regulator diode is refrained from consuming the power of the alternator, wherein the first threshold voltage value is greater than or equal to the second threshold voltage value.

15. The power allocation method of the synchronous rectifier alternator as claimed in claim 12, wherein controlling the ONs and OFFs of the first transistors and the second transistors of the synchronous rectifier circuit by the controller further comprises:
    controlling the ONs and OFFs of the first transistors and the second transistors by the controller if the voltage level of the DC electrical energy is still higher than or equal to the first threshold voltage value after the at least one regulator diode is cooled off for a first time length, such that the at least one regulator diode consumes the power of the alternator.

16. The power allocation method of the synchronous rectifier alternator as claimed in claim 15, wherein controlling the ONs and OFFs of the first transistors and the second transistors of the synchronous rectifier circuit by the controller further comprises:

detecting whether the voltage level of the DC electrical energy is lower than a second threshold voltage value by the controller; and controlling the ONs and OFFs of the first transistors and the second transistors of the synchronous rectifier circuit by the controller if the voltage level of the DC electrical energy is lower than the second threshold voltage value, such that the at least one regulator diode is refrained from consuming the power of the alternator, wherein the first threshold voltage value is greater than or equal to the second threshold voltage value.

\* \* \* \* \*